United States Patent
Jeong et al.

(10) Patent No.: US 9,854,161 B2
(45) Date of Patent: Dec. 26, 2017

(54) PHOTOGRAPHING DEVICE AND METHOD OF CONTROLLING THE SAME

(71) Applicant: SAMSUNG ELECTRONICS CO., LTD., Suwon-si, Gyeonggi-do (KR)

(72) Inventors: Jin-gu Jeong, Seongnam-si (KR); Hee-chul Han, Suwon-si (KR); Tae-hee Lee, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/078,315

(22) Filed: Mar. 23, 2016

(65) Prior Publication Data

US 2017/0150039 A1 May 25, 2017

(30) Foreign Application Priority Data

Nov. 24, 2015 (KR) .................. 10-2015-0164837

(51) Int. Cl.
*H04N 5/232* (2006.01)
*G06T 7/20* (2017.01)
*G06T 7/00* (2017.01)
*G06T 7/246* (2017.01)

(52) U.S. Cl.
CPC .......... *H04N 5/23222* (2013.01); *G06T 7/20* (2013.01); *G06T 7/246* (2017.01); *H04N 5/23293* (2013.01); *G06T 2207/10016* (2013.01); *G06T 2207/30196* (2013.01)

(58) Field of Classification Search
CPC .......... H04N 5/23222; H04N 5/23293; G06T 7/004; G06T 7/20; G06T 7/246; G06T 7/00; G06T 2207/30196; G06T 2207/10016

USPC ... 348/208.14, 208.13, 39, 143, 142, 333.04
See application file for complete search history.

(56) References Cited

U.S. PATENT DOCUMENTS

| 8,115,814 | B2 * | 2/2012 | Iwase | G08B 13/19608 345/427 |
| 8,275,413 | B1 * | 9/2012 | Fraden | H04M 1/72522 455/556.1 |
| 2002/0041327 | A1 * | 4/2002 | Hildreth | G06T 7/593 348/42 |
| 2008/0186386 | A1 * | 8/2008 | Okada | H04N 5/23248 348/208.4 |
| 2009/0034953 | A1 | 2/2009 | Hwang et al. | |

(Continued)

FOREIGN PATENT DOCUMENTS

| JP | 2005-020196 | 1/2005 |
| JP | 2010-081528 | 4/2010 |

(Continued)

OTHER PUBLICATIONS

Search Report and Written Opinion dated Aug. 19, 2016 in counterpart International Patent Application No. PCT/KR2016/001904.

*Primary Examiner* — Tuan Ho
*Assistant Examiner* — Marly Camargo
(74) *Attorney, Agent, or Firm* — Nixon & Vanderhye, P.C.

(57) ABSTRACT

A photographing device may include two or more lenses having different view angles, and a processor configured to detect a first subject using images acquired from the lenses and to generate a notification signal based on whether or not a second subject approaches the view angle of a first image including the first subject among the acquired images.

20 Claims, 25 Drawing Sheets

(56) References Cited

U.S. PATENT DOCUMENTS

| | | | |
|---|---|---|---|
| 2010/0201787 A1* | 8/2010 | Zehavi | G01S 5/16 348/48 |
| 2012/0092529 A1 | 4/2012 | Choi et al. | |
| 2012/0320212 A1* | 12/2012 | Aimura | B60R 1/00 348/148 |
| 2013/0194421 A1* | 8/2013 | Kita | H04N 7/18 348/143 |
| 2013/0201359 A1* | 8/2013 | Wu | H04N 5/23219 348/222.1 |
| 2015/0063640 A1 | 3/2015 | Anabuki | |

FOREIGN PATENT DOCUMENTS

| | | |
|---|---|---|
| JP | 2012-114655 | 6/2012 |
| JP | 2015-103968 | 6/2015 |
| KR | 10-2015-0078125 | 7/2015 |
| KR | 10-2015-0114320 | 10/2015 |

* cited by examiner

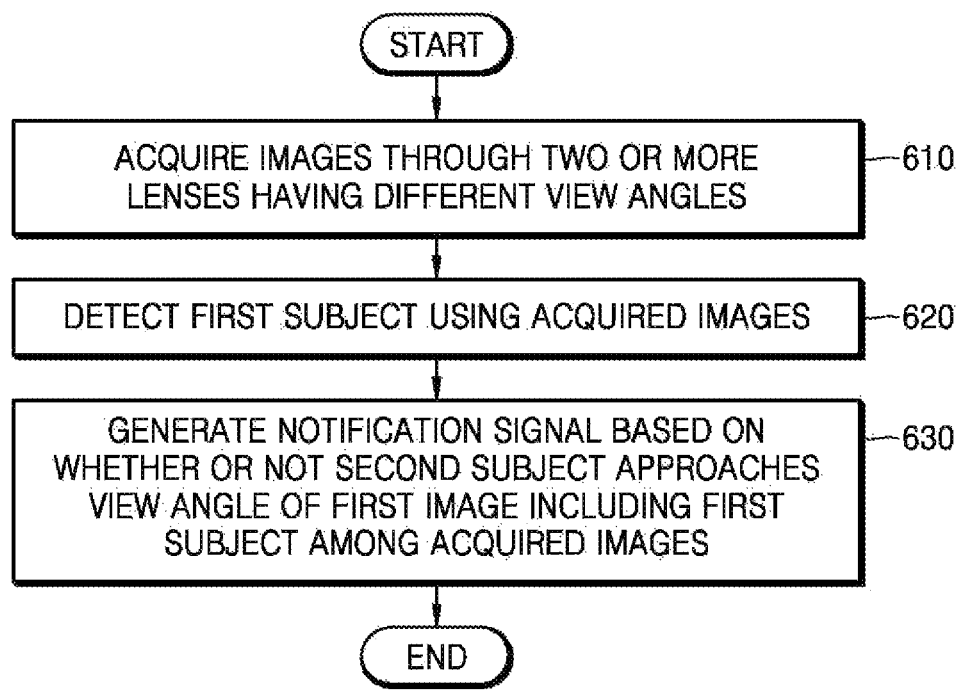

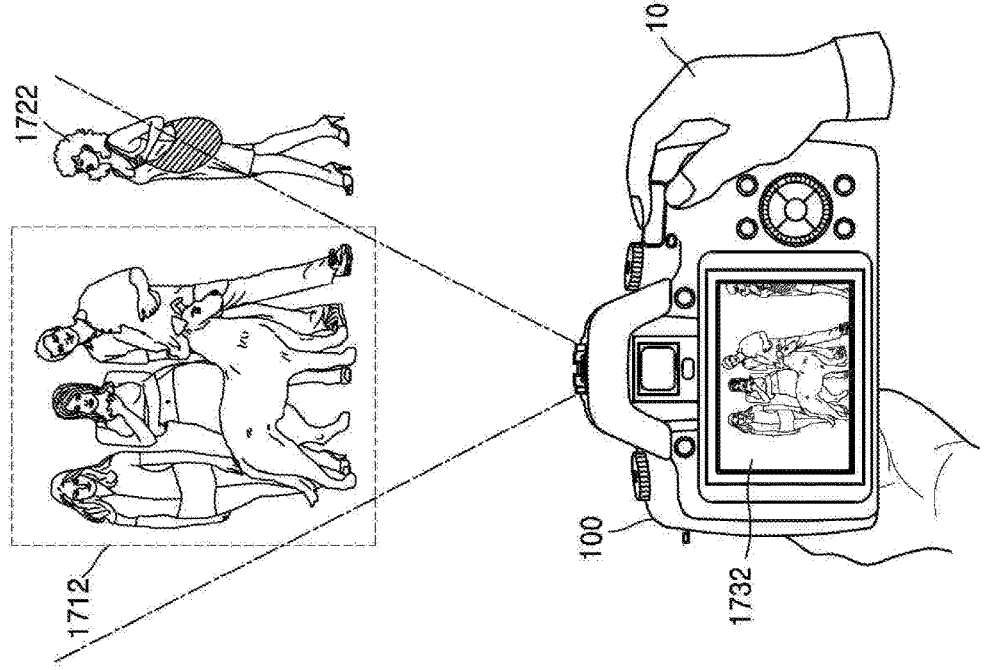
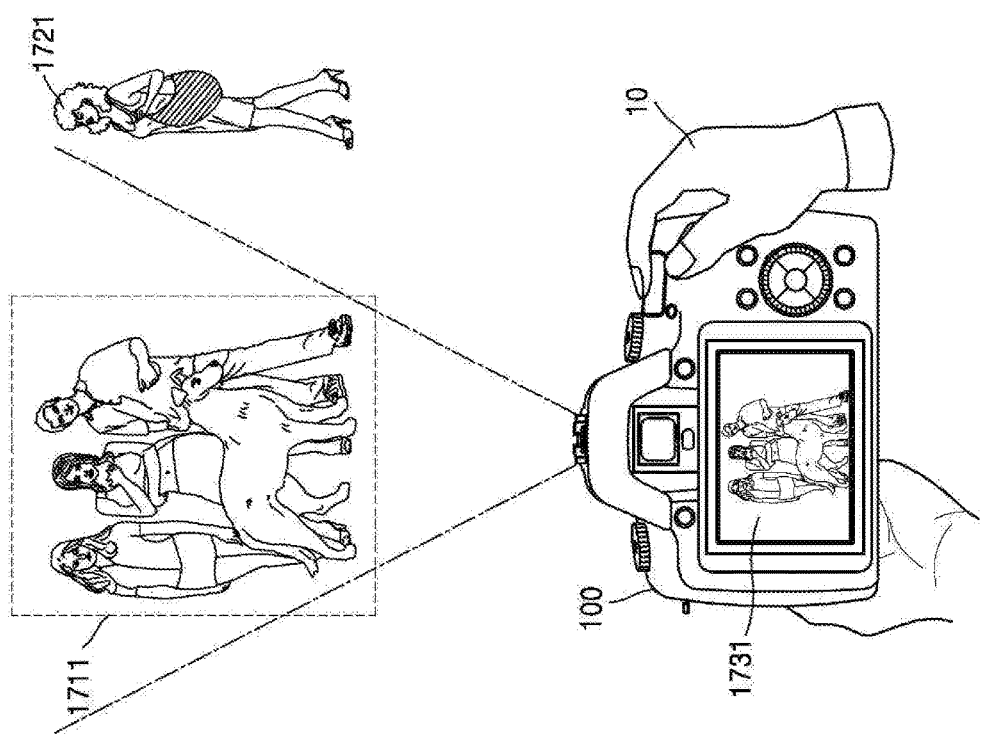

PHOTOGRAPHING DEVICE AND METHOD OF CONTROLLING THE SAME

CROSS-REFERENCE TO RELATED APPLICATION

This application is based on and claims priority under 35 U.S.C. §119 to Korean Patent Application No. 10-2015-0164837, filed on Nov. 24, 2015, in the Korean Intellectual Property Office, the disclosure of which is incorporated by reference herein in its entirety.

BACKGROUND

1. Field

The present disclosure relates to a photographing device and a method of controlling the same according to the proximity of a subject.

2. Description of the Related Art

With the development of technology related to photographing devices, a photographing device capable of taking a high-quality image is being developed. However, when an interfering object (i.e., an object which may interfere with photographing) other than a subject to be photographed is nearby while an image is taken, there is a probability that a user is not able to take an image due to interference of the interfering object.

SUMMARY

A photographing device and a method of controlling the same according to the proximity of a subject are provided.

A computer-readable recording medium storing a program for causing a computer to perform the aforementioned method is provided.

Additional aspects will be set forth in part in the description which follows and, in part, will be apparent from the description.

According to an aspect of an example embodiment, a photographing device includes two or more lenses having different view angles, and a processor configured to detect a first subject using images acquired from the lenses and to generate a notification signal based on whether a second subject approaches a view angle of a first image including the first subject among the acquired images.

In the above-described photographing device, the first subject may include a subject included in a final image generated by the photographing device.

In the above-described photographing device, the processor may be configured to select at least one of subjects included in a second image among the acquired images other than the first subject as the second subject.

In the above-described photographing device, the processor may be configured to detect the first subject among subjects included in the first image based on a user input.

In the above-described photographing device, the processor may be configured to detect figures of respective subjects included in the first image, and select the first subject using the detected figures.

In the above-described photographing device, the processor may be configured to detect the first subject among subjects included in the first image using pre-stored subject information.

In the above-described photographing device, the processor may be configured to acquire motion information of the second subject based on a second image included in the acquired images, and to determine whether the second subject approaches the view angle of the first image using the motion information.

In the above-described photographing device, the processor may be configured to acquire motion information of the second subject using pre-stored subject information, and to determine whether the second subject approaches the view angle of the first image using the motion information.

In the above-described photographing device, the notification signal may include a signal corresponding to an image or a sound output by the photographing device.

In the above-described photographing device, the processor may be configured to detect the first subject using the acquired images and information representing subjects received from an external device.

In the above-described photographing device, the processor may be configured to determine whether to take an image based on whether the second subject is included in the view angle of the first image.

In the above-described photographing device, the processor may be configured to change a video frame sampling rate based on whether the second subject is included in the view angle of the first image.

The above-described photographing device may further include a memory configured to store information of the first subject.

According to an aspect of another example embodiment, a method of controlling a photographing device includes acquiring images through two or more lenses having different view angles, detecting a first subject using the acquired images, and generating a notification signal based on whether a second subject approaches a view angle of a first image including the first subject among the acquired images.

In the above-described method, the first subject may include a subject included in a final image generated by the photographing device.

The above-described method may further include selecting at least one of subjects included in a second image among the acquired images other than the first subject as the second subject.

In the above-described method, the detecting of the first subject may include detecting the first subject among subjects included in the first image based on a user input.

In the above-described method, the detecting of the first subject may include detecting figures of respective subjects included in the first image, and selecting the first subject using the detected figures.

In the above-described method, the detecting of the first subject may include detecting the first subject among subjects included in the first image using pre-stored subject information.

In the above-described method, the generating of the notification signal may include acquiring motion information of the second subject based on a second image included in the acquired images, and determining whether the second subject approaches the view angle of the first image using the motion information.

In the above-described method, the generating of the notification signal may include acquiring motion information of the second subject using pre-stored subject information, and determining whether the second subject approaches the view angle of the first image using the motion information.

In the above-described method, the notification signal may include a signal corresponding to an image or a sound output by the photographing device.

The above-described method may further include receiving information representing subjects from an external device, wherein the detecting of the first subject may include detecting the first subject using the acquired images and the received information.

The above-described method may further include determining whether to take an image based on whether the second subject is included in the view angle of the first image.

The above-described method may further include changing a video frame sampling rate based on whether the second subject is included in the view angle of the first image.

The above-described method may further include storing information of the first subject.

According to an aspect of another example embodiment, a non-transitory computer-readable recording medium stores a program for causing a computer to perform the above-described method.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIG. 6 is a flowchart illustrating an example of a method of controlling a photographing device;

FIGS. 17A and 17B are diagrams illustrating an example in which a way of taking a still image is controlled;

DETAILED DESCRIPTION

Figure 1:
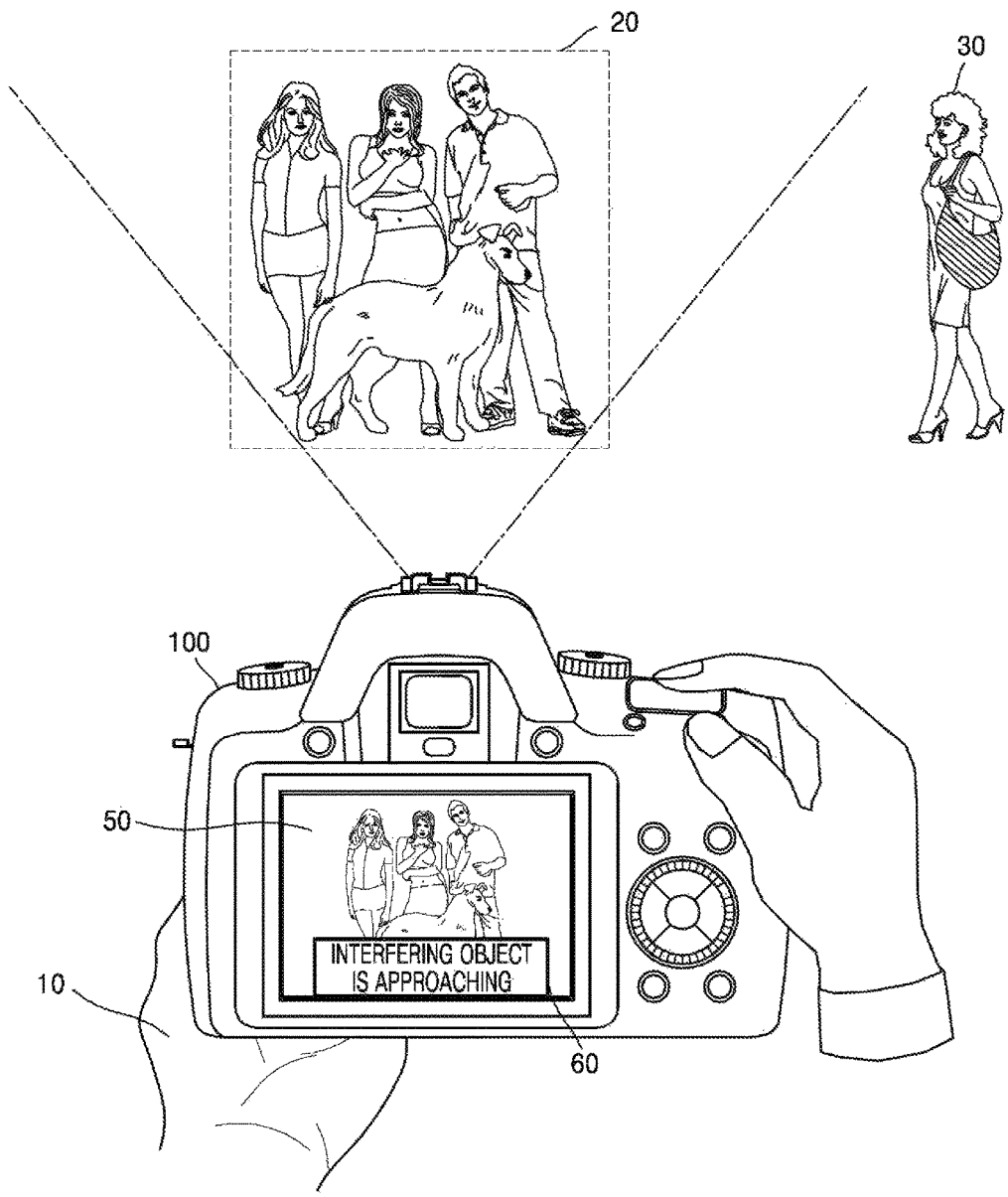
FIG. 1 is a diagram illustrating an example of a method of controlling a photographing device.

Reference will now be made in greater detail to example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are simply described below, by referring to the figures, to explain certain aspects. As used herein, the term "and/or" includes any and all combinations of one or more of the associated listed items. Expressions such as "at least one of," when preceding a list of elements, modify the entire list of elements and do not modify the individual elements of the list.

Throughout the disclosure, when a portion "includes" an element, unless otherwise described, another element may be further included, rather than the presence of other elements being excluded. Also, terms such as "unit" and "portion" used herein represent software elements and hardware elements (e.g., circuitry), including, for example, a field programmable gate array (FPGA) and an application-specific integrated circuit (ASIC), and a "unit" and a "portion" perform certain roles. However, a "unit" and a "portion" are not limited to software or hardware. A "unit" and a "portion" may be configured to reside on addressable storage media and configured to be executed on one or more processors. Therefore, examples of a "unit" and a "portion" may include elements such as software elements, object-oriented software elements, class elements, and task elements, processes, functions, attributes, procedures, subroutines, segments of program code, drivers, firmware, microcode, circuitry, data, databases, data structures, tables, arrays, and variables. Functions provided in elements and "portions" may be combined into fewer elements and "portions" or further separated into additional elements and "portions."

Throughout the disclosure, a "gesture" may, for example, refer to a hand motion, etc. made by a user. For example, a gesture stated in this disclosure may refer, for example, to a tap, a touch and hold, a double tap, dragging, panning, a flick, a drag and drop, and so on.

"Tap" may refer, for example, to the action of the user touching a screen very quickly with his or her finger or a touch tool (e.g., an electronic pen). For example, a tap represents a case in which there is a very small difference between a touch-in time point, which is a time point at which a finger or a touch tool comes in contact with a screen, and a touch-out time point, which is a time point at which the finger or the touch tool is removed from the screen.

"Touch and hold" may refer, for example, to the action of the user touching the screen with his or her finger or a touch tool and maintaining the touch input for a threshold time or longer. For example, a touch and hold represents a case in which a difference between a touch-in time point and a touch-out time point is a threshold time or longer. To make the user recognize whether a touch input is a tap or a touch and hold, a feedback signal may be provided in an auditory or tactile manner when the touch input is maintained for the threshold time or longer.

"Double tap" may refer, for example, to the action of the user quickly touching the screen two times with his or her finger or a touch tool.

"Dragging" may refer, for example, to the action of the user touching the screen with his or her finger or a touch tool and moving the finger or the touch tool to another position in the screen while maintaining the touch. Due to a drag action, an object (e.g., an image included in a thumbnail image) may be moved, or a panning action to be described below is performed.

"Panning" may refer, for example, to the action of the user taking a drag action without selecting an object. Since a panning action does not involve selecting any object, no objects move in an interactive screen, but the interactive screen itself is changed to a next page, or an object group moves in the interactive screen.

"Flick" may refer, for example, to the action of the user very quickly performing a drag action using his or her finger or a touch tool. A drag (or panning) action and a flick action may be distinguished from each other based on whether a moving speed of the finger or the touch tool is a threshold speed or faster.

"Drag and drop" may refer, for example, to the action of the user dragging an object to a position in the screen and dropping the object using his or her finger or a touch tool.

FIG. 1 is a diagram illustrating an example of a method of controlling a photographing device.

In FIG. 1, an example in which a user 10 photographs subjects 20 using a photographing device 100 is illustrated. For example, the photographing device 100 may include two or more lenses, and the respective lenses may have the same view angle or different view angles.

Based on a situation of a photography location, when the user 10 photographs the subjects (referred to as "first subjects" below) 20, another subject (referred to as a "second subject" below) 30 may be included in an image. For example, if the second subject 30 is an object capable of moving by itself (e.g., a person or an animal), the second subject 30 may not be included in the view angle of a lens during preparation for the photography, but may be included in the view angle of the lens during the photography. Therefore, the second subject 30 may be included in a final image generated by the photographing device 100.

The view angle of a lens may be used below as the same meaning as the view angle of an image acquired through the lens. For example, assuming that a first image is acquired through a first lens, the view angle of the first lens has the same meaning as the view angle of the first image in the following descriptions.

For example, the second subject 30 may pass in front of the first subjects 20 (i.e., between the first subjects 20 and the photographing device 100) or may pass behind the first subjects 20. In this example, the second subject 30 as well as the first subjects 20 that the user intends to photograph may be included in a final image generated by the photographing device 100.

The photographing device 100 includes two or more lenses, and the respective lenses may have different view angles. For example, assuming that two lenses are installed in the photographing device 100, one lens may have a narrow view angle, and the other lens may have a wide view angle. Generally, a lens having a narrow view angle has a relatively deep depth of field, so that a high-quality image may be acquired. A lens having a wide view angle has a relatively shallow depth of field, so that an image including a large area may be acquired.

The photographing device 100 may acquire an image showing the first subjects 20 through the lens having the narrow view angle, and determine whether or not the second subject 30 moves toward the first subjects 20 through the lens having the wide view angle. The photographing device 100 may transfer information on whether or not the second subject 30 is approaching the user 10, and the user 10 may take an image of the first subjects 20 without interference of the second subject 30.

Alternatively, the lenses included in the photographing device 100 may have the same view angle. Even if the lenses have the same view angle, it is possible to acquire images showing different areas through the lenses where, for example, the lenses are installed at different positions of the photographing device 100. Therefore, the photographing device 100 may transfer information on whether or not the second subject 30 approaches the user 10, and the user 10 may take an image of the first subjects 20 without interference of the second subject 30.

When the second subject 30 approaches the first subjects 20, the photographing device 100 may generate and output a notification signal for notifying the user 10 of the approach of the second subject 30. For example, the notification signal may be a signal corresponding to an image or a sound output by the photographing device 100. For example, the photographing device 100 may output an image 60 in a screen 50 indicating that the second subject 30 is approaching, or a sound indicating that the second subject 30 is approaching through a speaker of the photographing device 100.

Examples of the photographing device 100 will be described in greater detail below with reference to FIGS. 2 and 3.

Figure 2:
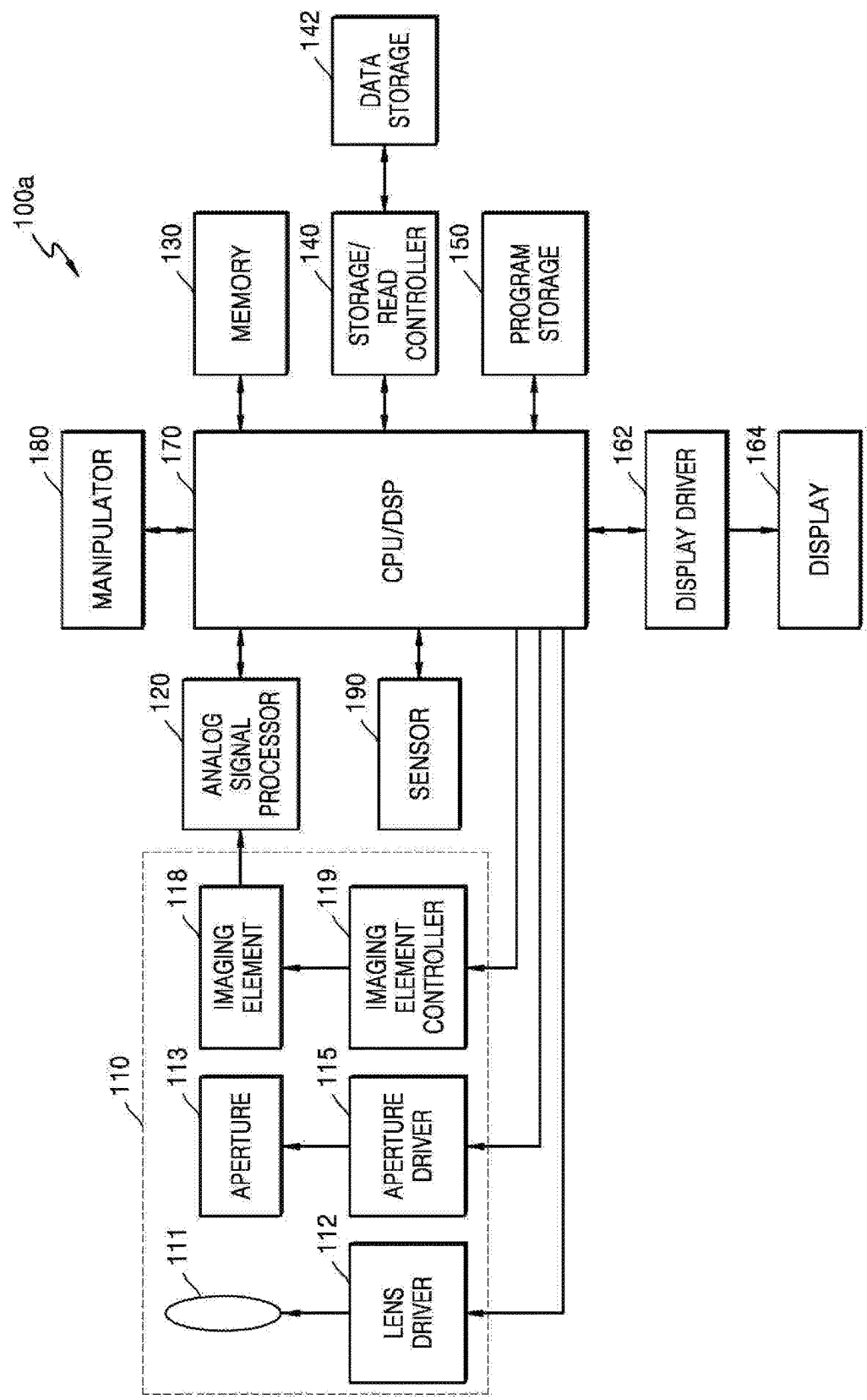
FIG. 2 is a block diagram illustrating an example configuration of an example of a photographing device.

FIG. 2 is a block diagram illustrating an example configuration of an example of a photographing device.

A photographing device 100a may include, for example, a photographing portion 110, an analog signal processor (e.g., including processing circuitry) 120, a memory 130, a storage/read controller (e.g., including processing circuitry) 140, a data storage 142, a program storage 150, a display driver (e.g., including driving circuitry) 162, a display (e.g., including a display panel) 164, a central processing unit/digital signal processor (CPU/DSP) (e.g., including processing circuitry) 170, and a manipulator (e.g., including input circuitry) 180.

The overall operation of the photographing device 100a may, for example, be managed by the CPU/DSP 170. In FIGS. 4 to 19, the CPU/DSP 170 may be referred to as a controller. The CPU/DSP 170 provides control signals for operation of the respective elements, such as a lens driver 112, an aperture driver 115, an imaging element controller 119, the display driver 162, the manipulator 180, etc., included in the photographing device 100a.

The photographing portion 110 may refer, for example, to an element that generates an image of an electric signal from incident light, and includes, for example, a lens 111, the lens driver 112, an aperture 113, the aperture driver 115, an imaging element 118, and the imaging element controller 119.

The lens 111 may include, for example, a plurality of lenses in a plurality of groups. When the photographing device 100a includes a plurality of lenses, the respective lenses may have different view angles or the same view angle. The position of the lens 111 may be adjusted by the lens driver 112. The lens driver 112 adjusts the position of the lens 111 based on a control signal provided, for example, by the CPU/DSP 170.

The degree of opening or closing of the aperture 113 may be adjusted by the aperture driver 115, and the aperture 113 may adjust the amount of light incident on the imaging element 118.

An optical signal transmitted through the lens 111 and the aperture 113 forms an image of a subject on a light-receiving surface of the imaging element 118. The imaging element 118 may be a charge-coupled device (CCD) image sensor or a complementary metal oxide semiconductor (CMOS) image sensor (CIS), or the like, which converts the optical signal into an electric signal. The sensitivity, etc. of the imaging element 118 may be adjusted by the imaging element controller 119. The imaging element controller 119 may control the imaging element 118 based on a control signal automatically generated by an image signal which is input in real time or a control signal manually input by a user's manipulation.

The exposure time of the imaging element 118 may be adjusted by a shutter (not shown). The shutter (not shown) may, for example, be a mechanical shutter which adjusts incidence of light by moving a cover or an electronic shutter which controls exposure by supplying an electric signal to the imaging element 118.

The analog signal processor 120 may be configured to perform noise reduction, gain adjustment, waveform standardization, analog-to-digital conversion, etc. on an analog signal supplied from the imaging element 118.

The signal processed by the analog signal processor 120 may be input to the CPU/DSP 170 through the memory 130, or input to the CPU/DSP 170 without going through the memory 130. For example, the memory 130 may operate as the main memory of the photographing device 100a, and temporarily stores information for the CPU/DSP 170 in operation. The program storage 150 stores programs, such as an operating system (OS) for running the photographing device 100a, an application system, and so on.

In addition, the photographing device 100a includes the display 164 to display an operation state thereof or information on an image taken by the photographing device 100a. The display 164 may provide visual information and/or auditory information to the user. To provide visual information, the display 164 may include, for example, a liquid crystal display (LCD) panel, an organic light-emitting display panel, and so on.

The photographing device 100a may include two or more displays 164, and may include, for example, a touch screen capable of recognizing a touch input. For example, the photographing device 100a may include a display which displays a live view image showing a target to be photographed, and a display which displays a state of the photographing device 100a.

The display driver 162 provides a driving signal to the display 164.

The CPU/DSP 170 processes an input image signal, and controls respective elements based on the processed image signal or an external input signal. The CPU/DSP 170 may reduce noise in input image data, and perform image signal processing, such as gamma correction, color filter array interpolation, color matrix, color correction, color enhancement, etc., for improving image quality. Also, the CPU/DSP 170 may be configured to generate an image file by compressing image data which is obtained through image signal processing for improving image quality, or restore the image data from the image file. A compression format of an image may be reversible or irreversible. As an example of an appropriate format, it is possible to convert a still image into a Joint Photographic Experts Group (JPEG) format, a JPEG 2000 format, and so on. Also, when a video is recorded, a video file may be generated by compressing a plurality of frames according to a Moving Picture Experts Group (MPEG) standard. The image file may be generated, for example, according to an exchangeable image file format (Exif) standard.

Image data output from the CPU/DSP 170 may be input to the storage/read controller 140 directly or through the memory 130, and the storage/read controller 140 may store the image data in the data storage 142 automatically or according to a signal from the user. The storage/read controller 140 may read data about an image from an image file stored in the data storage 142 and input the read data to the display driver 162 through the memory 130 or another route, so that the image may be displayed on the display 164. The data storage 142 may be detachable or permanently installed in the photographing device 100a.

Also, the CPU/DSP 170 may perform obscuring, chromatic processing, blurring, edge emphasis, image interpretation, image recognition, image effect processing, and so on. Through image recognition, face recognition, scene recognition, etc. may be performed. Further, the CPU/DSP 170 may process a display image signal to be displayed on the display 164. For example, the CPU/DSP 170 may perform brightness level adjustment, color correction, contrast adjustment, contour emphasis adjustment, screen segmentation, generation of a character image and the like, image composition, and so on. The CPU/DSP 170 may be connected to an external monitor, perform certain image signal processing, and transmit image data processed in this way, so that the corresponding image may be displayed on the external monitor.

Moreover, the CPU/DSP 170 may execute a program stored in the program storage 150 or include an additional module to generate a control signal for controlling autofocusing, zoom change, focus change, automatic exposure correction, etc., provide the control signal to the aperture driver 115, the lens driver 112, and the imaging element controller 119, and collectively control operation of elements, such as the shutter, a strobe, etc., included in the photographing device 100a.

The manipulator 180 may, for example, be an element to which the user may input a control signal. The manipulator 180 may include, for example, a variety of function buttons, such as a shutter-release button which inputs a shutter-release signal for exposing the imaging element 118 to light for a determined time for photography, a power button which inputs a control signal for controlling power on/off, a zoom button which widens or narrows a view angle based on an input, a mode selection button, buttons which adjust other photographic setting values, and so on. The manipulator 180 may be implemented in any form, such as buttons, a keyboard, a touch pad, a touch screen, a remote control, etc., through which the user may input a control signal.

The sensor (e.g., including sensor circuitry) 190 may, for example, measure a physical quantity or sense an operating state of the photographing device 100a and convert the measured or sensed information into an electrical signal. An example of the sensor 190 which may be included in the photographing device 100a will be described below with reference to FIG. 3. The sensor 190 may further include a control circuit for controlling one or more sensors belonging thereto. In an example embodiment, the photographing device 100a may further include a processor configured to control the sensor 190 as a part of the CPU/DSP 170 or separately from the CPU/DSP 170, thereby controlling the sensor 190 while the CPU/DSP 170 is in a sleep state.

The photographing device 100a illustrated in FIG. 2 is an example showing elements for carrying out photography, and photographing devices according to some example embodiments are not limited to the photographing device 100a shown in FIG. 2.

Another example of the photographing device 100 will be described in greater detail below with reference to FIG. 3.

Figure 3:
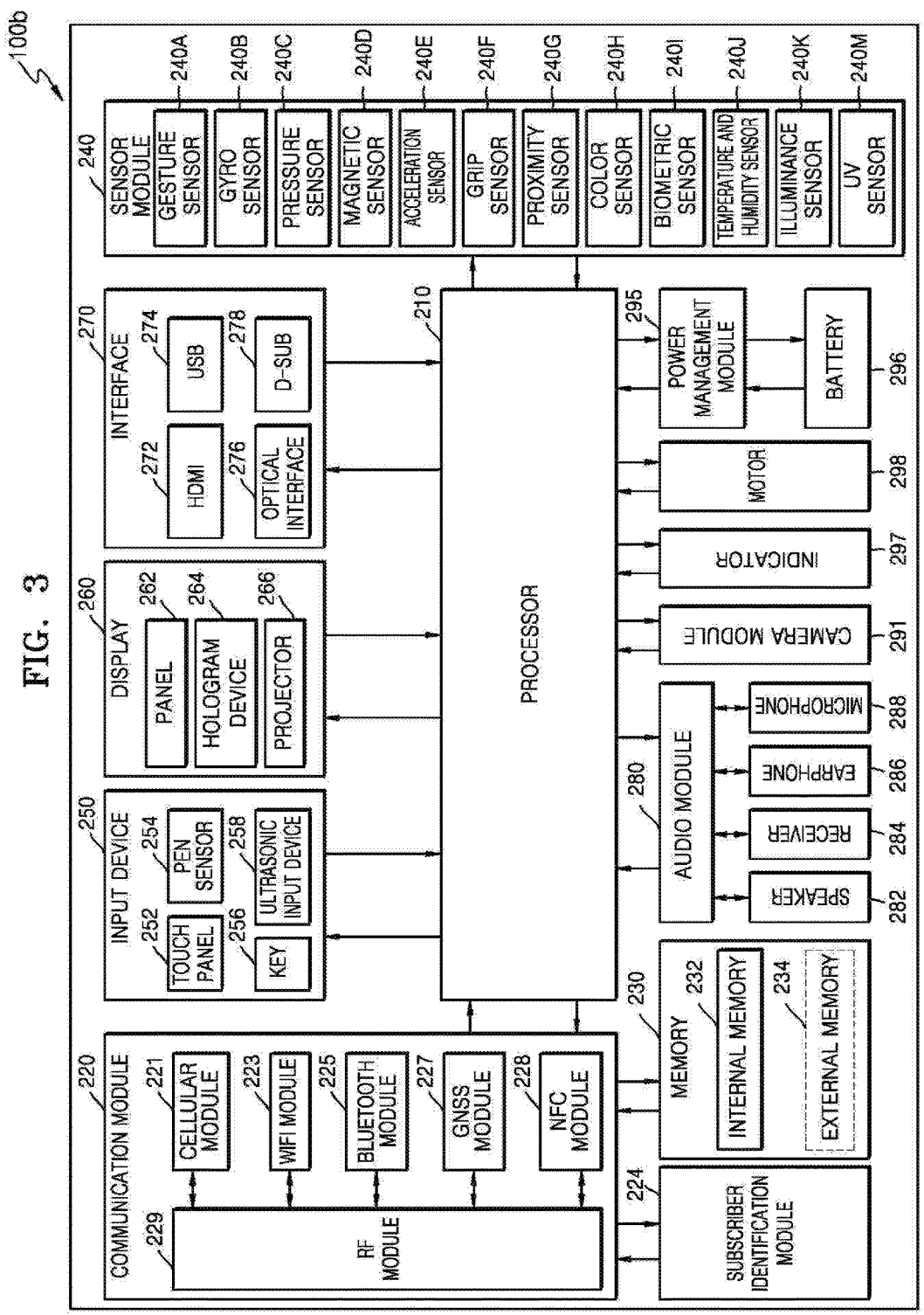
FIG. 3 is a block diagram illustrating an example configuration of another example of a photographing device.

FIG. 3 is a diagram illustrating an example configuration of another example of a photographing device.

For example, an electronic device 100b may include all or a part of the photographing device 100 illustrated in FIG. 1 or the photographing device 100a illustrated in FIG. 2. The electronic device 100b may include one or more processors (e.g., a CPU/DSP or an application processor (AP)) (e.g., including processing circuitry) 210, a communication module (e.g., including communication circuitry) 220, a subscriber identification module (SIM) 224, a memory 230, a sensor module (e.g., including at least one sensor including sensor circuitry) 240, an input device (e.g., including input circuitry) 250, a display (e.g., including a display panel and display driving circuitry) 260, an interface (e.g., including interface circuitry) 270, an audio module 280, a camera module 291, a power management module 295, a battery 296, an indicator 297, and a motor 298.

By running an OS or an application program, the processor 210 may be configured to control a plurality of hardware or software elements connected thereto, and to perform a variety of data processing and calculations. The processor 210 may be implemented as, for example, a system on chip (SoC). According to an example embodiment, the processor 210 may further include a graphics processing unit (GPU) and/or an image signal processor (ISP). The processor 210 may include at least some (e.g., a cellular module 221) of the elements shown in FIG. 3. The processor 210 may load an instruction or data received from at least one (e.g., a non-volatile memory) of other elements into a volatile memory, and store various data in the non-volatile memory.

The communication module 220 may include, for example, a cellular module 221, a wireless fidelity (WiFi) module 223, a Bluetooth (BT) module 225, a global navigation satellite system (GNSS) module 227 (e.g., a global positioning system (GPS) module, a Globalnaya navigatsionnaya sputnikovaya sistema (GLONASS) module, a BeiDou module, or a Galileo module), a near field communication (NFC) module 228, and a radio frequency (RF) module 229.

The cellular module 221 may provide, for example, a voice call service, a video call service, a short message service, an Internet service, etc. through, for example, a communication network. According to an example embodiment, the cellular module 221 may identify and authenticate the electronic device 100b using the SIM (e.g., a SIM card) 224 in a communication network. According to an example embodiment, the cellular module 221 may perform at least some of functions which are able to be provided by the processor 210. According to an example embodiment, the cellular module 221 may include a communication processor (CP).

Each of the WiFi module 223, the BT module 225, the GNSS module 227, and the NFC module 228 may include, for example, a processor for processing data transceived through the corresponding module. According to an example embodiment, at least some (e.g., two or more) of the cellular module 221, the WiFi module 223, the BT module 225, the GNSS module 227, and the NFC module 228 may be included in one integrated chip (IC) or IC package.

The RF module 229 may transceive, for example, communication signals (e.g., RF signals). The RF module 229 may include, for example, a transceiver, a power amp module (PAM), a frequency filter, a low noise amplifier (LNA), an antenna, and so on. According to another example embodiment, at least one of the cellular module 221, the WiFi module 223, the BT module 225, the GNSS module 227, and the NFC module 228 may transceive RF signals through a separate RF module.

The SIM 224 may include, for example, a card including a SIM and/or an embedded SIM, and unique identification information (e.g., integrated circuit card identifier (ICCID)) or subscriber information (e.g., international mobile subscriber identity (MI)).

The memory 230 may include, for example, an internal memory 232 and/or an external memory 234. The internal memory 232 may include, for example, at least one of a volatile memory (e.g., a dynamic RAM (DRAM), a static RAM (SRAM), a synchronous dynamic RAM (SDRAM), etc.), and a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, etc.), a hard disk drive, and a solid state drive (SSD)), or the like.

The external memory 234 may include a flash drive, for example, a compact flash (CF) memory card, a secure digital (SD) memory card, a micro-SD memory card, a mini-SD memory card, an extreme digital (XD) memory card, a multimedia card (MMC), a memory stick, and so on. Through various interfaces, the external memory 234 may be connected to the electronic device 100b functionally and/or physically.

The sensor module 240 may, for example, include one or more sensors that measure a physical quantity or sense an operational state of the electronic device 100b, and convert the measured or sensed information into an electrical signal. The sensor module 240 may include at least one of, for example, a gesture sensor 240A, a gyro sensor 240B, an atmospheric pressure sensor (e.g., pressure sensor) 240C, a magnetic sensor 240D, an acceleration sensor 240E, a grip sensor 240F, a proximity sensor 240G, a color sensor 240H (e.g., a red, green, and blue (RGB) sensor), a biometric 240I, a temperature/humidity sensor 240J, a brightness sensor (e.g., illuminance sensor) 240K, and an ultraviolet (UV) sensor 240M. Additionally or alternatively, the sensor module 240 may include, for example, an electronic nose (e-nose) sensor, an electromyography (EMG) sensor, an electroencephalogram (EEG) sensor, an electrocardiogram (ECG) sensor, an infrared (IR) sensor, an iris sensor, and/or a fingerprint sensor, or the like. The sensor module 240 may further include a control circuit for controlling one or more sensors belonging thereto. In an embodiment, the electronic device 100b may further include a processor configured to control the sensor module 240 as a part of the processor 210 or separately from the processor 210, thereby controlling the sensor module 240 while the processor 210 is in the sleep state.

The input device 250 may include, for example, a touch panel 252, a (digital) pen sensor 254, a key 256, or an ultrasonic input device 258. The touch panel 252 may use at least one of, for example, capacitive, resistive, infrared, and ultrasonic techniques. The touch panel 252 may further include a control circuit. The touch panel 252 may further include a tactile layer to provide a tactile reaction to the user.

The (digital) pen sensor 254 may be, for example, a part of a touch panel, or may include, for example, a separate recognition sheet. The key 256 may include, for example, physical buttons, optical keys, or a keypad. The ultrasonic input device 258 may sense an ultrasonic wave generated by an input tool through a microphone (e.g., a microphone 288) and determine data corresponding to the sensed ultrasonic wave.

The display 260 (e.g., the display 164) may include a panel 262, a hologram device 264, or a projector 266. The panel 262 may be implemented to be, for example, flexible, transparent, or wearable. The panel 262 may include one module with the touch panel 252. The hologram device 264 may show a three-dimensional (3D) image in the air using interference of light. The projector 266 may display an image by projecting light to a screen. The screen may be positioned, for example, inside or outside the electronic device 100*b*. According to an example embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. Additionally or alternatively, the interface 270 may include, for example, a mobile high-definition link (MHL) interface, an SD card/MMC interface, or an infrared data association (IrDA) standard interface, or the like.

The audio module 280 may be configured to convert, for example, a sound to an electrical signal and vice versa. The audio module 280 may process sound information input or output through, for example, a speaker 282, a receiver 284, an earphone 286, the microphone 288, and so on.

The camera module 291 is, for example, a device capable of taking a still image or a video. According to an example embodiment, the camera module 291 may include one or more image sensors (e.g., a front sensor and a rear sensor), a lens, an ISP, and a flash (e.g., a light-emitting diode (LED), a xenon lamp, etc.). When the camera module 291 has a plurality of lenses, the respective lenses may have different view angles or the same view angle.

The power management module 295 may manage, for example, the power of the electronic device 100*b*. According to an example embodiment, the power management module 295 may include a power management integrated circuit (PMIC), a charger IC, or a battery or fuel gauge. The PMIC may employ a wired and/or wireless charging method. The wireless charging method includes, for example, magnetic resonance wireless charging, magnetic induction wireless charging, electromagnetic wave wireless charging, etc., and an additional circuit for wireless charging, such as a coil loop, a resonance circuit, a rectifier, etc., may be further necessary. A battery gauge may measure, for example, the residual power, charging voltage, current, or temperature of the battery 296. The battery 296 may include, for example, a rechargeable battery and/or a solar battery.

The indicator 297 may display a particular state, for example, a booting state, a message state, a charging state, etc., of the electronic device 100*b* or a part (e.g., the processor 210) of the electronic device 100*b*. The motor 298 may convert an electric signal into mechanical vibration, and cause vibration, haptic effects, and so on. Although not illustrated in FIG. 3, the electronic device 100*b* may include a processing device (e.g., a GPU) for supporting a mobile television (TV). The processing device for supporting the mobile TV may process media data conforming to a standard, for example, digital multimedia broadcasting (DMB), digital video broadcasting (DVB), MediaFlo™, and so on.

Each of the elements described herein may, for example, be configured as one or more components, and the name of the corresponding element may vary based on the type of the electronic device. In various example embodiments, an electronic device may be configured to include at least one of the elements described herein. Some elements may be omitted, or other elements may be additionally included. Some of the elements of the electronic device according to various example embodiments may be combined into one entity, which may perform the same functions as the elements before the combination.

As described above with reference to FIGS. 1 to 3, the photographing device 100 or 100*a* or the electronic device 100*b* may include a plurality of lenses. Examples in which the plurality of lenses acquire images will be described in greater detail below with reference to FIGS. 4 and 5.

The photographing device 100 to be described below with reference to FIGS. 4 to 25 may correspond to the photographing device 100*a* or the electronic device 100*b* described above with reference to FIGS. 2 and 3. A processor described below with reference to FIGS. 4 to 25 may correspond to the CPU/DSP 170 or the processor 210 of FIG. 3.

Figure 4:
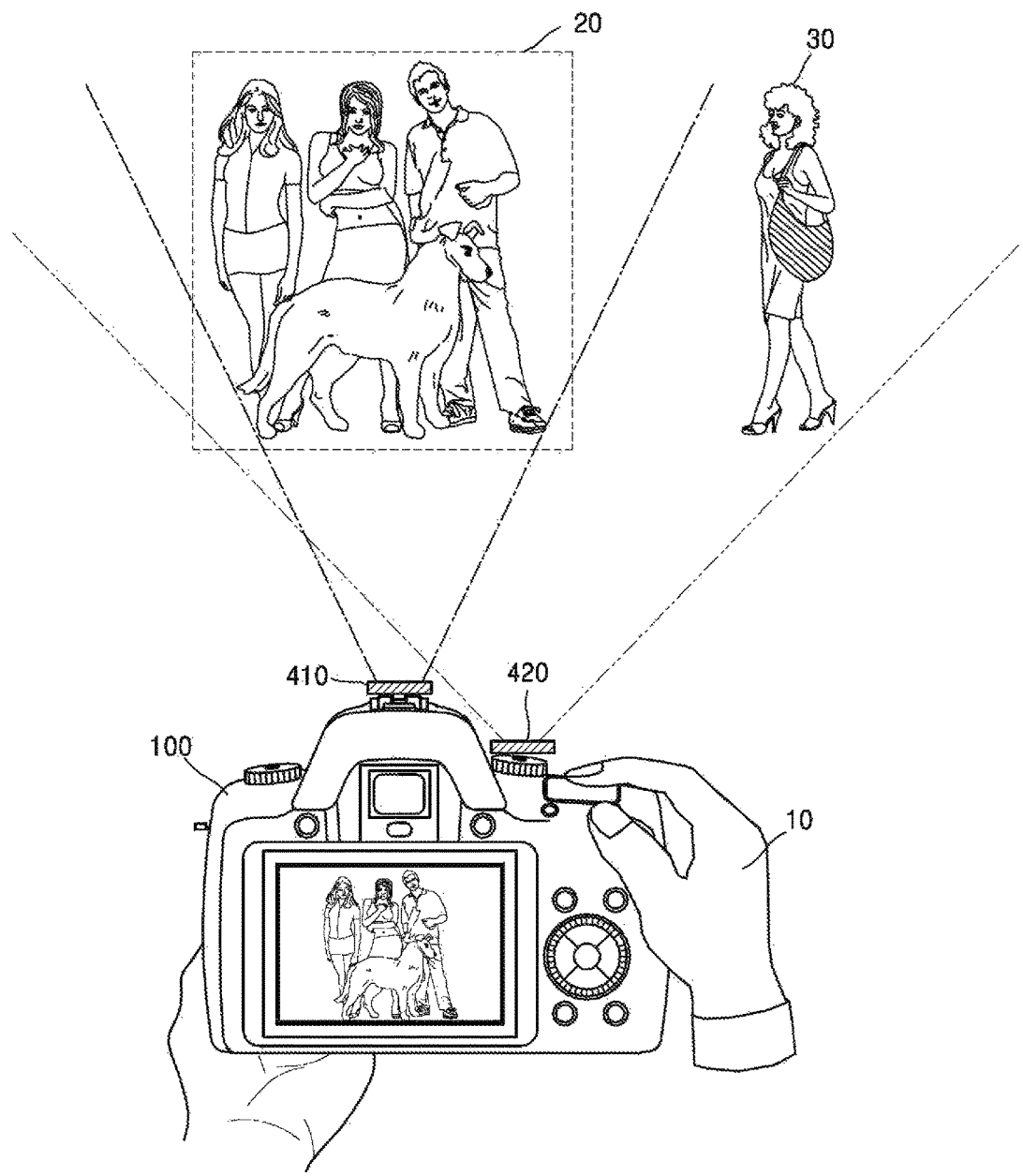
FIG. 4 is a diagram illustrating an example in which a plurality of lenses have different view angles.

FIG. 4 is a diagram illustrating an example in which a plurality of lenses have different view angles.

FIG. 4 illustrates an example in which the photographing device 100 includes two lenses 410 and 420, and the lenses 410 and 420 have different view angles. In FIG. 4, the lenses 410 and 420 are illustrated to be separated from the photographing device 100 for convenience of description, but those of ordinary skill in the art will appreciate that the lenses 410 and 420 may be configured as parts of the photographing device 100. The positions of the lenses 410 and 420 are not limited to those shown in FIG. 4, and the lenses 410 and 420 may be positioned at various portions of the photographing device 100 according to the manufacturer's intention.

The user 10 photographs the first subjects 20 using the photographing device 100. For example, the first subjects 20 denote targets that the user 10 intends to photograph and subjects included in a final image generated by the photographing device 100.

The user 10 may adjust the position of the photographing device 100 so that the first subjects 20 are included in the view angle of the first lens 410. For example, the first lens 410 may have a narrow view angle but a relatively deep depth of field.

While the user 10 photographs the first subjects 20, the second subject 30 may approach the first subjects 20. For example, the second subject 30 may not be a target that the user 10 intends to photograph and denotes a person, an animal, or an object capable of moving by itself. Therefore, when the second subject 30 comes close to the first subjects 20 during the photography, the figure of second subject 30 may be unintentionally included in an image showing the first subjects 20.

The second lens 420 of the photographing device 100 may, for example, have a wider view angle than the first lens 410. Therefore, not only the first subjects 20 but also the second subject 30 may be included in the view angle of the second lens 420.

Since the photographing device 100 includes the lenses 410 and 420 having different view angles, subjects included in the field of view of each of the lenses 410 and 420 may be different. For example, while the first subjects 20 are included in the view angle of the first lens 410, the first subjects 20 and the second subject 30 may be included in the view angle of the second lens 420. Therefore, the photographing device 100 may determine whether or not the second subject 30 moves and whether or not the second subject 30 approaches the view angle of the first lens 410 using an image acquired through the second lens 420.

Even when the user 10 does not change the position of the photographing device 100, the photographing device 100 may generate images for tracking a moving object (e.g., the second subject 30). For example, even when the moving object leaves the view angle of the first lens 410, if the moving object is included in the view angle of the second lens 420, the photographing device 100 may output images (e.g., live view images) for tracking the moving object in real time using images acquired through the first lens 410, images acquired through the second lens 420, and images obtained by combining them.

Figure 5:
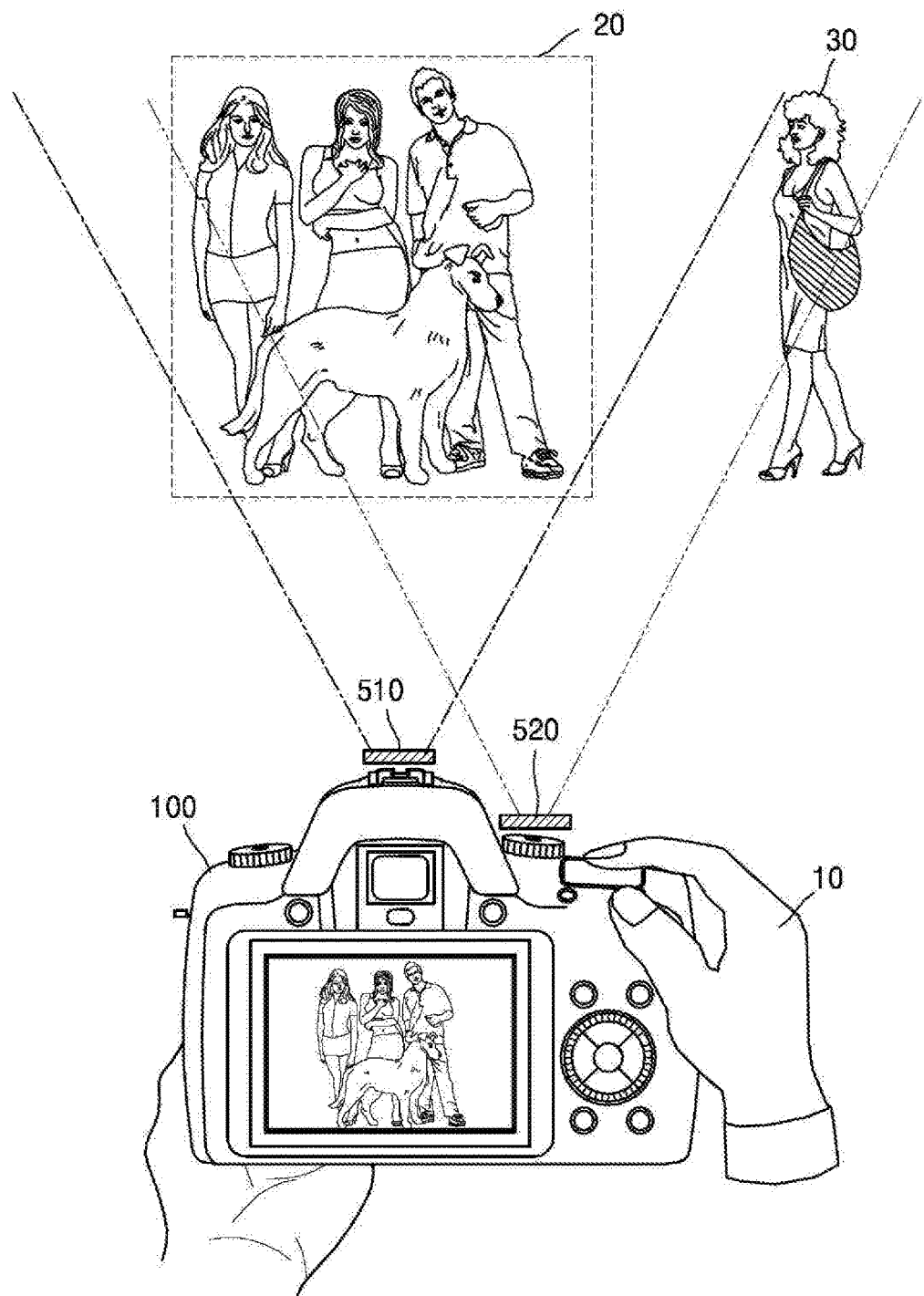
FIG. 5 is a diagram illustrating an example in which a plurality of lenses have the same view angle.

FIG. 5 is a diagram illustrating an example in which a plurality of lenses have the same view angle.

FIG. 5 illustrates an example in which the photographing device 100 includes two lenses 510 and 520, and the lenses 510 and 520 have the same view angle. In FIG. 5, the lenses 510 and 520 are illustrated to be separated from the photographing device 100 for convenience of description. However, as mentioned above with reference to FIG. 4, the lenses 510 and 520 may be configured as parts of the photographing device 100, and the positions of the lenses 510 and 520 are not limited to those illustrated in FIG. 4.

Even when the lenses 510 and 520 have the same view angle, the positions of the lenses 510 and 520 in the photographing device 100 differ from each other, and thus a region covered by the view angle of the first lens 510 may differ from a region covered by the view angle of the second lens 520.

When the position of the photographing device 100 is adjusted so that the first subjects 20 are included in the view angle of the first lens 510, the second subject 30 may not be included in the view angle of the first lens 510 but may be included in the view angle of the second lens 520. Therefore, the photographing device 100 may determine whether or not the second subject 30 moves and whether or not the second subject 30 approaches the view angle of the first lens 510 using an image acquired through the second lens 520.

Further, even when the user 10 does not change the position of the photographing device 100, the photographing device 100 may generate images for tracking a moving object (e.g., the second subject 30). For example, even when the moving object gets out of the view angle of the first lens 510, if the moving object is included in the view angle of the second lens 520, the photographing device 100 may output images (e.g., live view images) for tracking the moving object in real time using images acquired through the first lens 510, images acquired through the second lens 520, and images obtained by combining them.

As described above with reference to FIGS. 4 and 5, the photographing device 100 may determine whether or not the second subject 30 approaches the view angle of the first lens 410 or 510. When the second subject 30 approaches the view angle of the first lens 410 or 510, the photographing device 100 may generate a notification signal for notifying the user 10 of the approach of the second subject 30 and output the notification signal. Examples in which the photographing device 100 generates a notification signal will be described in greater detail below with reference to FIGS. 6 to 17.

The photographing device 100 may automatically determine whether or not to carry out photography according to whether or not the second subject 30 approaches the view angle of the first lens 410 or 510. Further, the photographing device 100 may determine a sampling rate of video frames included in a video. Examples in which the photographing device 100 controls a photographing process will be described in greater detail below with reference to FIGS. 17 and 18.

FIG. 6 is a flowchart illustrating an example of a method of controlling a photographing device.

Referring to FIG. 6, a method of controlling a photographing device includes operations processed over time in the photographing device 100 or 100a or the electronic device 100b illustrated, for example, in FIGS. 1 to 5. Even if omitted below, the descriptions made above regarding the photographing device 100 or 100a or the electronic device 100b illustrated in FIGS. 1 to 5 may also be applied to the method of controlling a photographing device illustrated in FIG. 6.

In operation 610, a processor is configured to acquire images through two or more lenses. For example, the two or more lenses may have different view angles. For example, assuming that two lenses are included in a photographing device, a first lens may have a narrower view angle than a second lens.

Figure 7A:
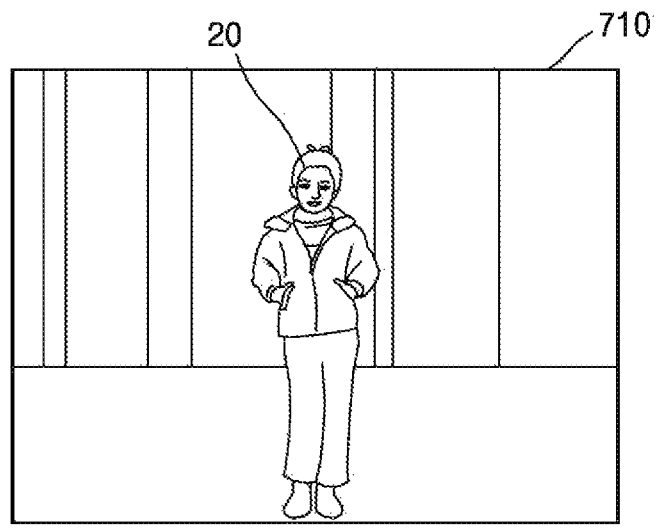
FIGS. 7A and 7B are diagrams illustrating examples of images acquired through lenses having different view angles.
Figure 7B:
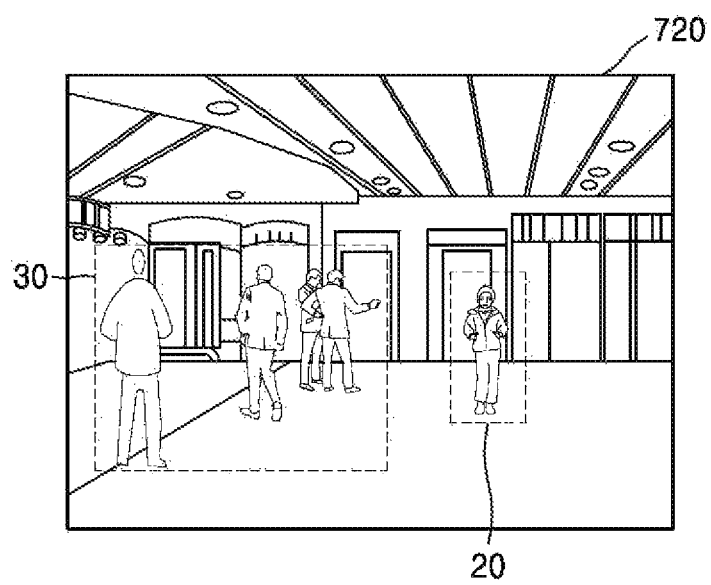

FIGS. 7A and 7B are diagrams illustrating examples of images acquired through lenses having different view angles.

FIG. 7A illustrates an image 710 taken by the first lens, and FIG. 7B illustrates an image 720 taken by the second lens. For example, it is assumed that the first lens has a narrower view angle than the second lens. Generally, a lens having a narrow view angle has a deeper depth of field than a lens having a wide view angle. Therefore, the image 710 generated through the first lens shows a smaller region than the image 720 generated through the second lens, but may be a relatively high-quality image.

In the image 710, a first subject 20 to be included in a final image generated by the photographing device 100 is shown. For example, when the user 10 intends to photograph the first subject 20, the photographing device 100 may generate the high-quality image 710 through the first lens.

On the other hand, not only the first subject 20 but also second subjects 30 are shown in the image 720. For example, since the second lens has a wider view angle than the first lens, the image 720 acquired through the second lens may include the entire region shown in the image 710 acquired through the first lens. Therefore, in the image 720, the second subjects 30 which may potentially interfere with the photography are shown together with the first subject 20 that the user 10 intends to photograph.

Referring back to FIG. 6, in operation 620, the processor is configured to detect a first subject using the acquired images. For example, the first subject denotes a subject that is intended to be included in a final image generated by the photographing device and that a user intends to photograph.

In an example, the processor may be configured to detect the first subject among subjects included in a first image based on a user input. For example, the first image may denote a target that the user 10 intends to photograph, and may be acquired through a lens having a narrow view angle.

In another example, the processor may be configured to detect the figures of respective subjects included in the first image, and select the first subject using the detected figures. For example, the processor may be configured to detect the figures of the subjects in the first image using an object segmentation technique, and may select the first subject from among the detected figures.

In still another example, the processor may be configured to detect the first subject among the subjects included in the first image using pre-stored subject information. For example, the processor may be configured to read out information of previously photographed subjects from a memory, and select a subject corresponding to the information read out from the memory among the subjects included in the first image as the first subject.

Examples in which the processor detects a first subject in a first image will be described in greater detail below with reference to FIGS. 8 to 10.

Figure 8:
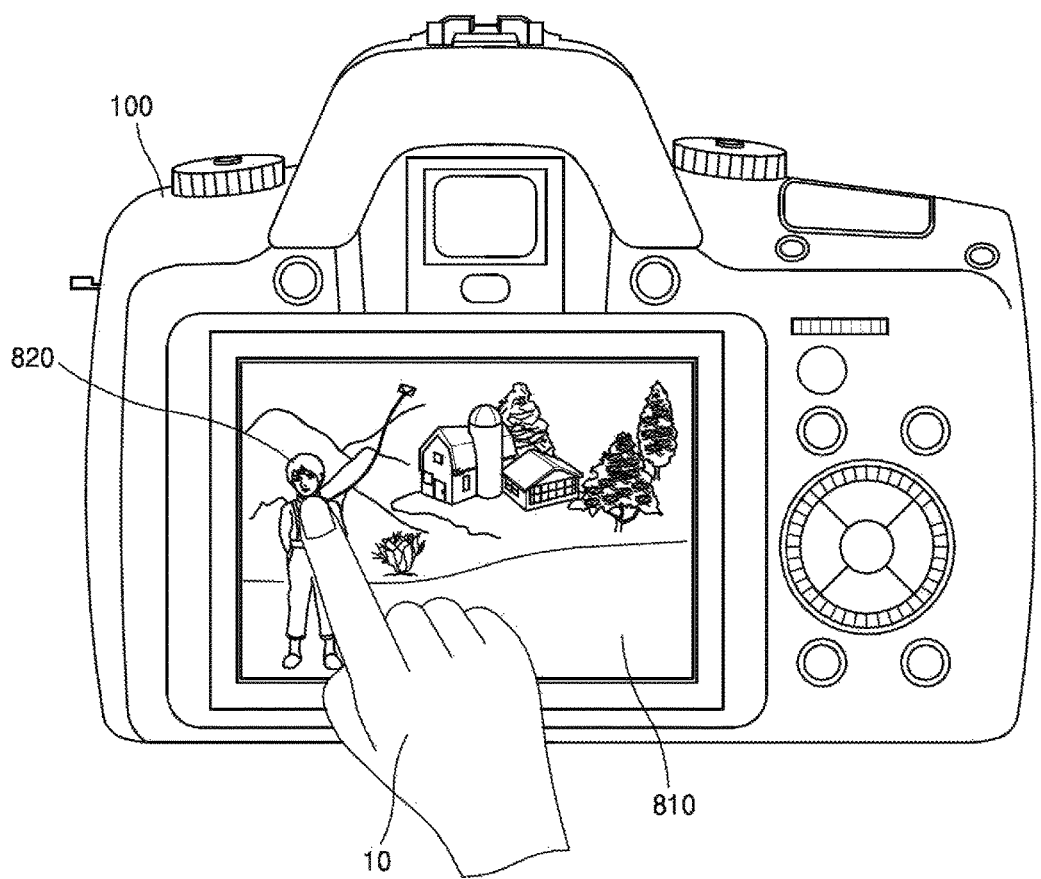
FIG. 8 is a diagram illustrating an example in which a first subject is detected.

FIG. 8 is a diagram illustrating an example in which a first subject is detected.

In FIG. 8, an example in which a live view image 810 is output on the screen of the photographing device 100 is illustrated. The photographing device 100 may output the live view image 810 acquired through a lens included therein on the screen.

A processor of the photographing device 100 may be configured to detect a first subject 820 among subjects included in the live view image 810 based on a user input. For example, the first subject 820 denotes a target that the user 10 intends to photograph.

For example, the user 10 may designate the first subject 820 in the live view image 810 output on the screen. Assuming that the screen of the photographing device 100 is a touch screen, the user 10 may make a gesture (e.g., a tap) at a point on the screen at which the first subject 820 is shown, and the gesture of the user 10 may be input to the photographing device 100 as a user input for designating the first subject 820. The processor may be configured to detect the first subject 820 in the live view image 810 based on the user input.

Figure 9:
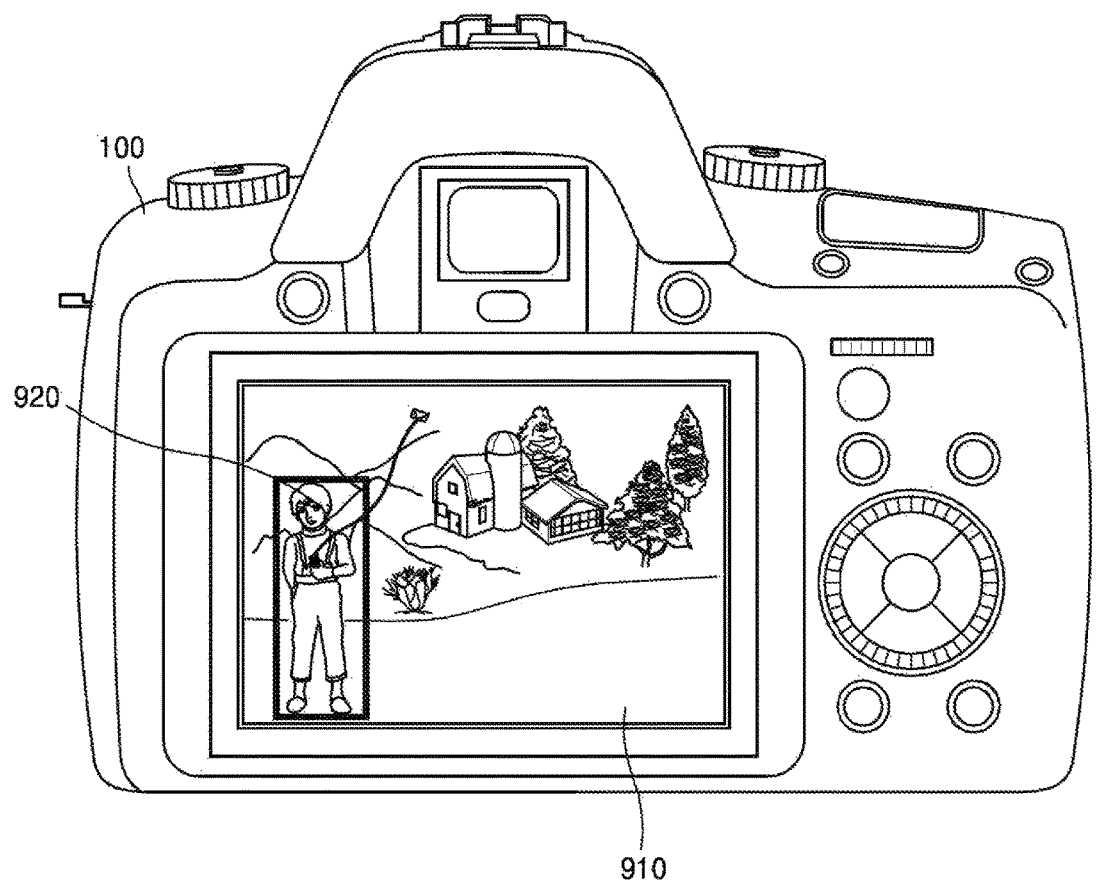
FIG. 9 is a diagram illustrating another example in which a first subject is detected.

FIG. 9 is a diagram illustrating another example in which a first subject is detected.

In FIG. 9, an example in which a live view image 910 is output on the screen of the photographing device 100 is illustrated.

The processor of the photographing device 100 may be configured to detect the figures of respective subjects included in the live view image 910. At this time, a general object segmentation technique may be used as a technique for the processor to detect the figures of the subjects in the live view image 910.

The processor may be configured to select a first subject 920 from among the detected figures. For example, the processor may be configured to select a figure positioned in a main region of the live view image 910 as the first subject 920.

The processor may be configured to mark a subject selected as the first subject 920 (e.g., with a box) to be distinguished from other subjects, and the user may change the subject selected by the processor to another subject. For example, the user may change the first subject 920 based on the process described above with reference to FIG. 8.

When a first subject is detected according to the method described above with reference to FIG. 8 or 9, the processor may be configured to store information on the first subject in a memory of the photographing device 100. For example, the information on the first subject may include information on the figure of the first subject (e.g., the figure of a face or a whole body), information on clothes worn by the first subject, and so on.

Figure 10:
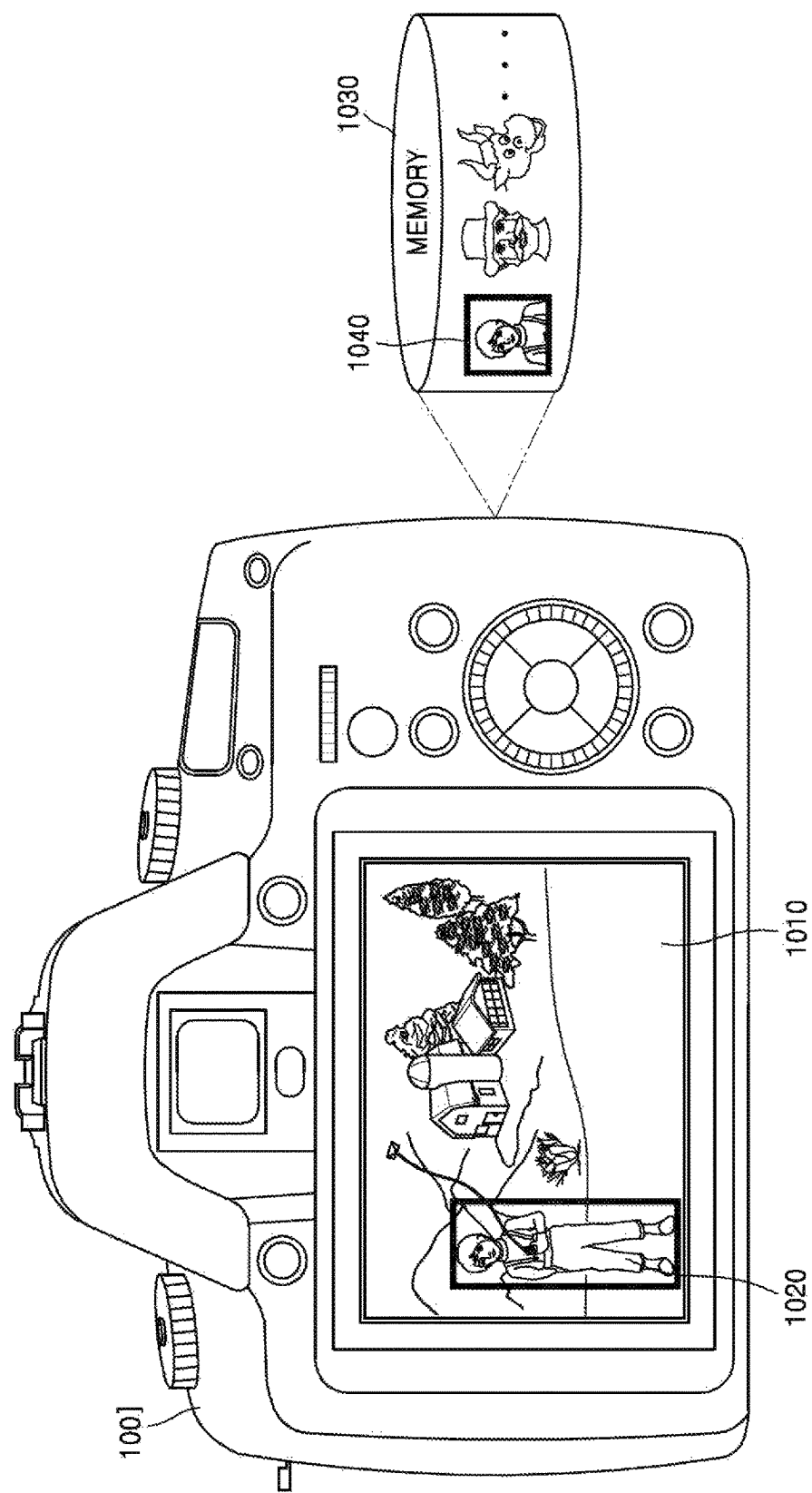
FIG. 10 is a diagram illustrating still another example in which a first subject is detected.

FIG. 10 is a diagram illustrating still another example in which a first subject is detected.

In FIG. 10, an example in which a live view image 1010 is output on the screen of the photographing device 100 is illustrated.

The processor of the photographing device 100 may be configured to detect a first subject 1020 among subjects included in the live view image 1010 using pre-stored subject information. For example, the processor may be configured to detect the figures of respective subjects included in the live view image 1010. At this time, a process of the processor detecting the figures of the subjects in the live view image 1010 is as described above with reference to FIG. 9.

The processor may be configured to select the first subject 1020 using subject information stored in a memory 1030. For example, information representing subjects included in previously taken images is stored in the memory 1030, and the processor may be configured to search for information 1040 matching with the subject 1020 included in the live view image 1010 from information stored in the memory 1030. When the matching information 1040 is found, the processor may be configured to select a subject matching with the retrieved information 1040 as the first subject 1020.

The processor may mark the subject selected as the first subject 1020 (e.g., with a box) to be distinguished from other subjects, and the user may change the subject selected by the processor to another subject. For example, the user may change the first subject 1020 according to the process described above with reference to FIG. 8.

Referring back to FIG. 6, in operation 630, the processor is configured to generate a notification signal based on whether or not a second subject approaches the view angle of a first image including the first subject among the acquired images. For example, when a second subject approaches the view angle of the first image, the processor may be configured to generate a notification signal and output the generated notification signal. Examples in which the processor generates a notification signal will be described in greater detail below with reference to FIGS. 11 to 15.

Figure 11:
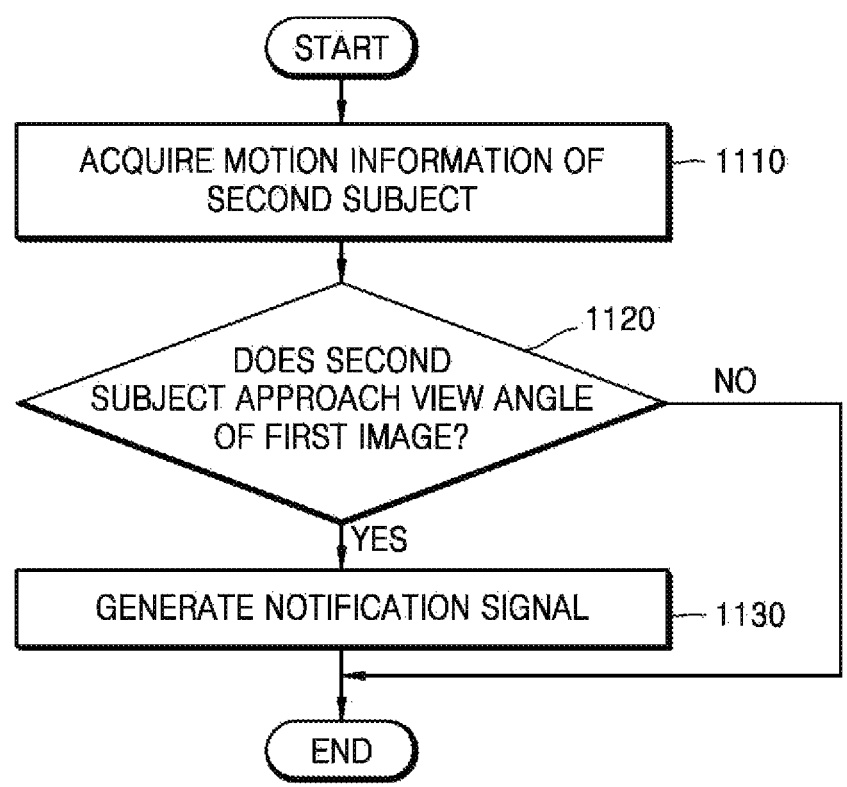
FIG. 11 is a flowchart illustrating an example in which a notification signal is generated.

FIG. 11 is a flowchart illustrating an example of generating a notification signal.

In operation 1110, the processor may be configured to acquire motion information of a second subject. For example, the motion information may include information representing which direction the second subject moves and/or how fast the second subject moves. The second subject denotes a subject that the user does not intend to photograph. For example, the second subject denotes a subject which is not included in a final image generated by the photographing device 100. For example, the second subject may be an object capable of moving by itself (e.g., a person or an animal).

The processor may be configured to select a second image from among images acquired by the photographing device 100. The processor may be configured to detect at least one subject included in the second image other than a first subject as the second subject. For example, the second image denotes an image acquired through a second lens among a plurality of lenses included in the photographing device 100. For example, the second lens may have a wider view angle than a first lens.

As described above with reference to FIGS. 4 and 5, the photographing device 100 may include a plurality of lenses, and images may be acquired through the respective lenses. For example, the processor may detect the first subject using an image acquired through the first lens. Examples in which the processor detects a first subject using an image acquired through the first lens are as described above with reference to FIGS. 8 to 10. The processor may be configured to detect the second subject using an image acquired through the second lens which is different from the first lens.

The processor may be configured to acquire motion information of the second subject. In an example, the processor may acquire motion information of the second subject based on the second image. For example, the second image denotes an image acquired through the second lens among the plurality of lenses included in the photographing device 100. For example, the second lens may have a wider view angle than the first lens. In another example, the processor may be configured to acquire motion information of the second subject using pre-stored subject information.

Examples in which the processor is configured to acquire motion information of a second subject using pre-stored subject information will be described in greater detail below with reference to FIGS. 12 and 13.

Figure 12:
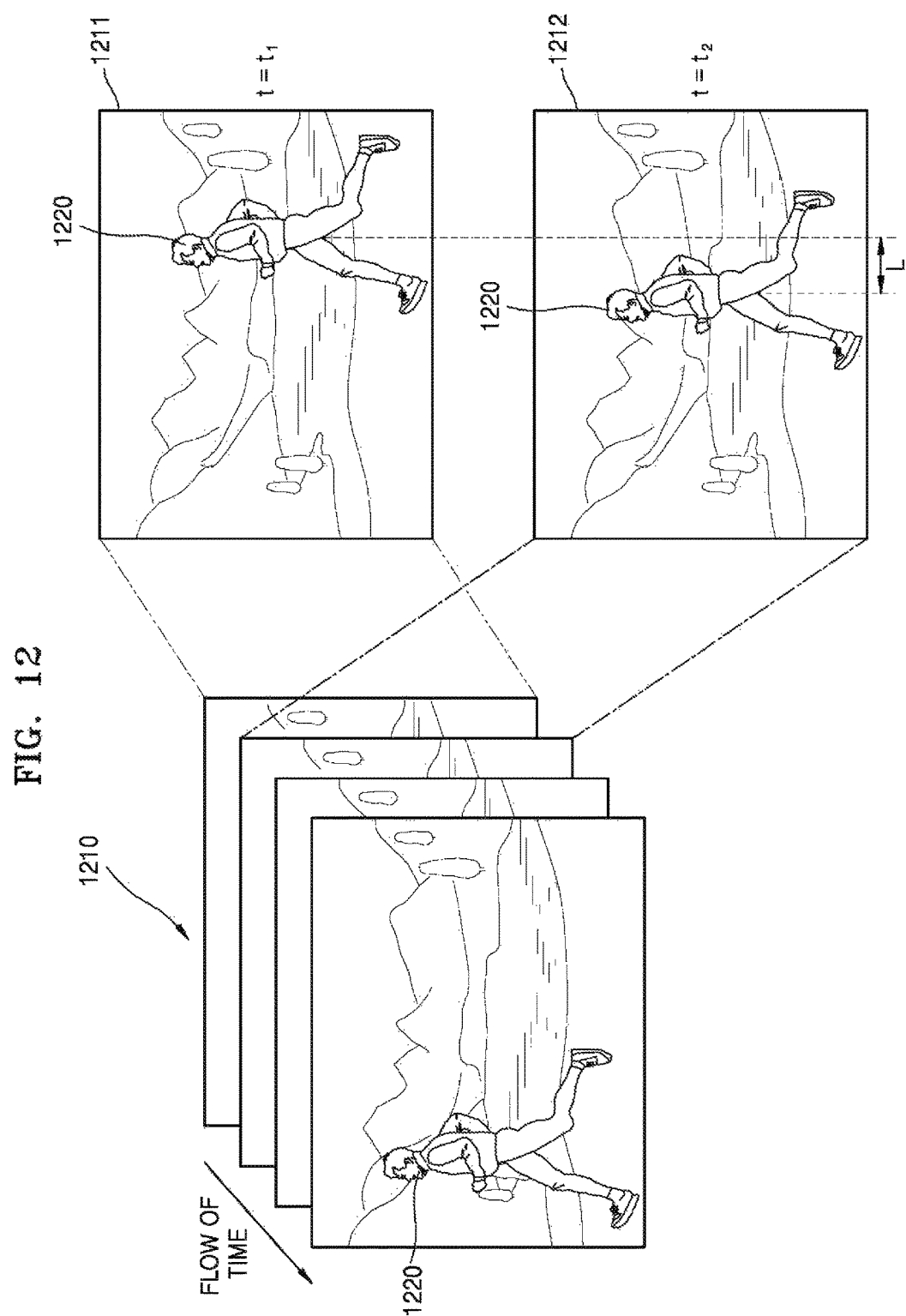
FIG. 12 is a diagram illustrating an example in which motion information of a second subject is acquired.

FIG. 12 is a diagram illustrating an example in which motion information of a second subject may be acquired.

In FIG. 12, examples of second images 1210 acquired by the photographing device 100 are illustrated. A second subject 1220 is included in the second images 1210, which denote images acquired through a second lens included in the photographing device 100. For example, the second lens denotes a lens which is not a first lens among a plurality of lenses included in the photographing device 100, and may have a wider view angle than the first lens. As an example, only the first subject is included in images acquired through the first lens, and not only the first subject but also the second subject 1220 is included in images acquired through the second lens (i.e., the second images 1210).

The processor may be configured to detect the second subject 1220 using the second images 1210. For example, the processor may be configured to detect at least one subject included in the second images 1210 other than the first subject as the second subject 1220. An example in which the processor detects the second subject 1220 using the second images 1210 is as described above with reference to FIG. 11.

Based on the second images 1210, the processor may be configured to acquire motion information of the second subject 1220. For example, the processor may be configured to determine the position of the second subject 1220 in an image 1211 included in the second images 1210. The processor may be configured to determine the position of the second subject 1220 in an image 1212 included in the second images 1210. The processor may know a time point t1 at which the image 1211 has been taken and a time point t2 at which the image 1212 has been taken. The processor may be configured to determine the distance between the photographing device 100 and the second subject 1220 using the second images 1210. From a difference L between the position of the second subject 1220 in the image 1211 and the position of the second subject 1220 in the image 1212, the processor may know a distance that the second subject 1220 has actually moved. The processor may be configured to determine an actual speed of the second subject 1220 using the difference (t2−t1) between the time points t1 and t2 at which the images 1211 and 1212 are taken and the difference L between the position of the second subject 1220 in the image 1211 and the position of the second subject 1220 in the image 1212. The processor may be configured to determine which direction the second subject 1220 is moving based on a direction in which the second subject 1220 has moved in the second images 1210.

Figure 13:
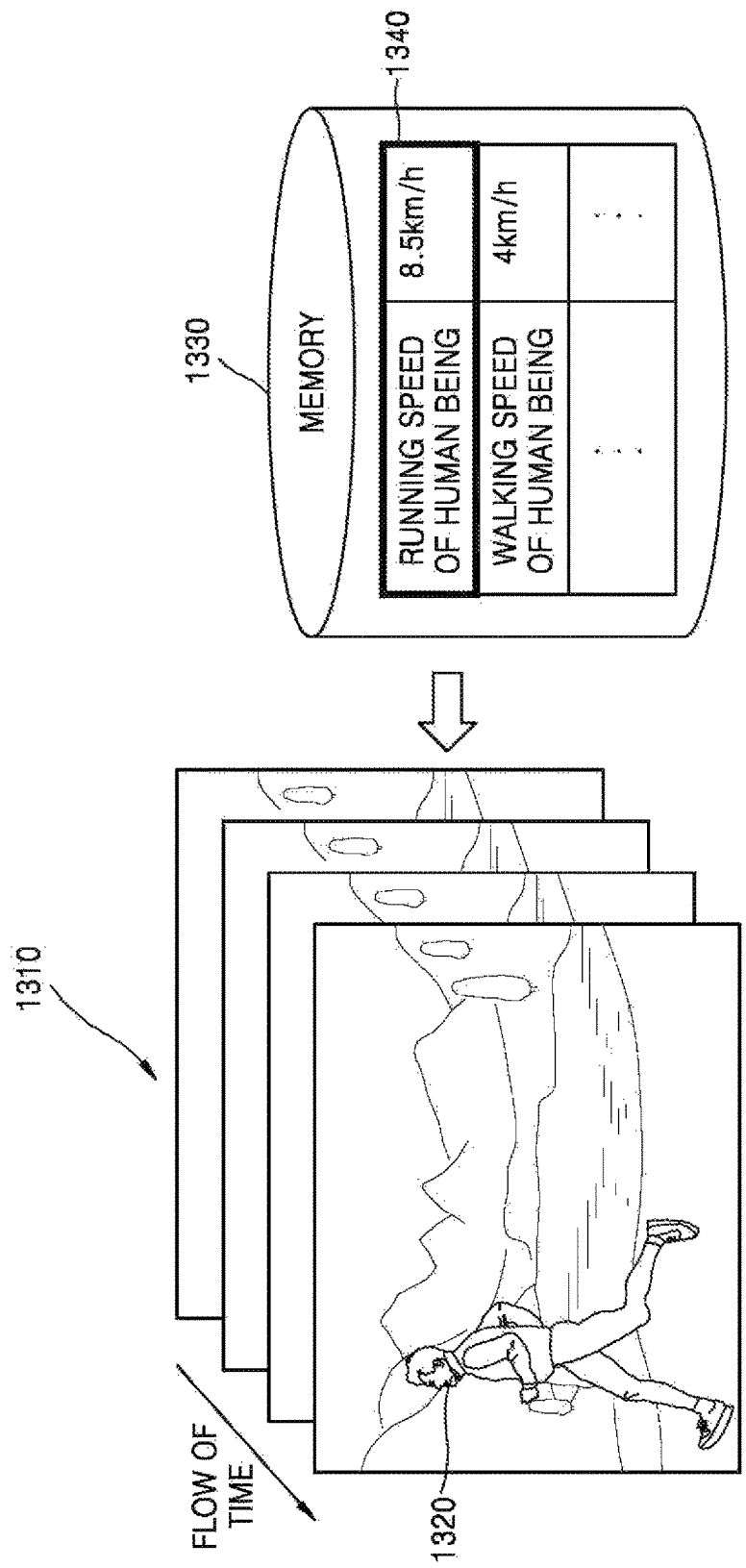
FIG. 13 is a diagram illustrating another example in which motion information of a second subject is acquired.

FIG. 13 is a diagram illustrating another example in which motion information of a second subject is acquired.

In FIG. 13, examples of second images 1310 acquired by the photographing device 100 are illustrated. As described above with reference to FIG. 12, the second images 1310 are images acquired through the second lens and include a second subject 1320 as well as a first subject.

The processor may be configured to acquire motion information of the second subject 1320 using pre-stored subject information. For example, kinds of subjects and speeds based on types of movement of the subjects may be stored in a memory 1330 of the photographing device 100. For example, assuming that a subject is a person, a running speed of a human being, a walking speed of a human being, etc. may be stored in the memory 1330.

The processor may be configured to identify the kind of the second subject 1320 using the second images 1310. For example, the processor may be configured to identify the kind of the second subject 1320 through the figures of subjects shown in the second images 1310. The processor may be configured to determine a movement type of the second subject 1320. For example, the processor may determine whether the second subject 1320 is running or whether the second subject 1320 is walking.

Assuming that the second subject 1320 is identified as a person who is running, the processor may read out data 1340 corresponding to the running speed of a human being from the data stored in the memory 1330. Using the data 1340 read out, the processor may be configured to determine a speed at which the second subject 1320 moves. The processor may be configured to determine which direction the second subject 1320 is moving based on a direction in which the second subject 1320 has moved in the second images 1310.

Referring back to FIG. 11, in operation 1120, the processor is configured to determine whether or not the second subject approaches the view angle of a first image. When the second subject approaches the view angle of the first image, the process proceeds to operation 1130.

In operation 1130, the processor is configured to generate a notification signal. For example, the notification signal may be a signal corresponding to an image or a sound output by the photographing device 100. For example, the photographing device 100 may output an image indicating that the second subject is approaching on the screen, or a sound indicating that the second subject is approaching through a speaker of the photographing device 100. Examples of a notification signal generated by the processor will be described in greater detail below with reference to FIGS. 14 and 15.

Figure 14:
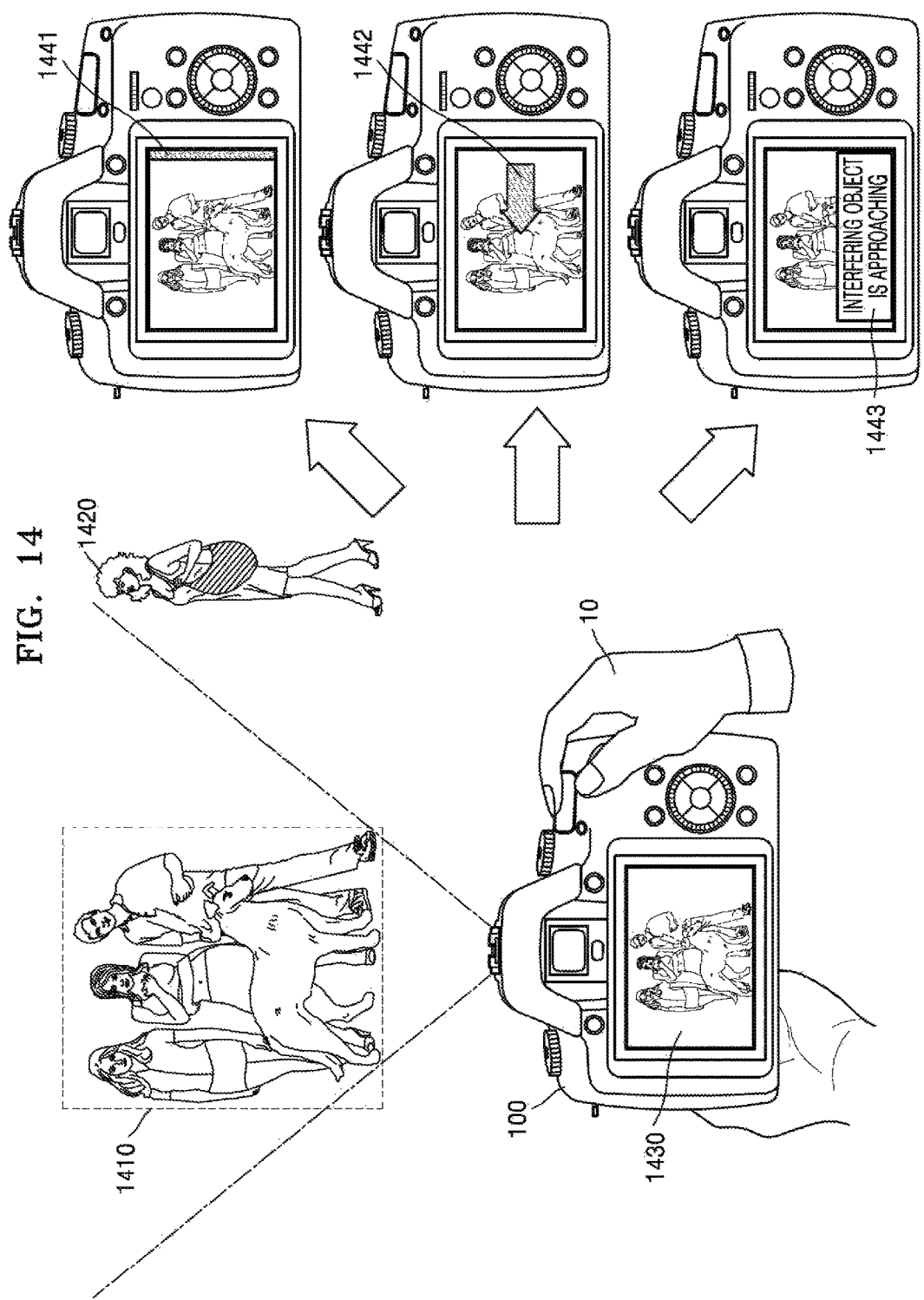
FIG. 14 is a diagram illustrating an example of generating a notification signal according to some embodiments.

FIG. 14 is a diagram illustrating an example of a notification signal.

Referring to FIG. 14, the processor may be configured to generate a notification signal corresponding to an image output by the photographing device 100. For example, when a second subject 1420 approaches first subjects 1410 while the photographing device 100 is photographing the first subjects 1410, the processor may be configured to generate a notification signal. For example, when the second subject 1420 approaches the view angle of a first lens of the photographing device 100, the processor may be configured to generate a notification signal. In this example, the first lens denotes a lens used to take an image of the first subjects 1410.

The processor may be configured to output the generated notification signal on a screen 1430 of the photographing device 100. For example, a live view image including the first subjects 1410 may be output on the screen 1430 together with the notification signal.

As an example, the notification signal may include, for example, a bar 1441 blinking in a part of the screen. For example, the bar 1441 may be generated to blink faster as the second subject 1420 approaches the view angle of the first lens.

As another example, the notification signal may include, for example, an arrow 1442 output in a part of the screen 1430. For example, the arrow 1442 may be an arrow indicating from which side the second subject 1420 approaches first subjects 1410.

As still another example, the notification signal may include, for example, a warning message 1443 output in a part of the screen 1430. The warning message 1443 indicating that the second subject 1420 is moving toward the view angle of the first lens may be output on the screen 1430.

A notification signal generated by the processor is not limited to the notification signals 1441, 1442, and 1443 illustrated in FIG. 14. For example, any image capable of notifying the user 10 that the second subject 1420 is moving toward the first subjects 1410 may correspond to a notification signal without any limitations.

Figure 15:
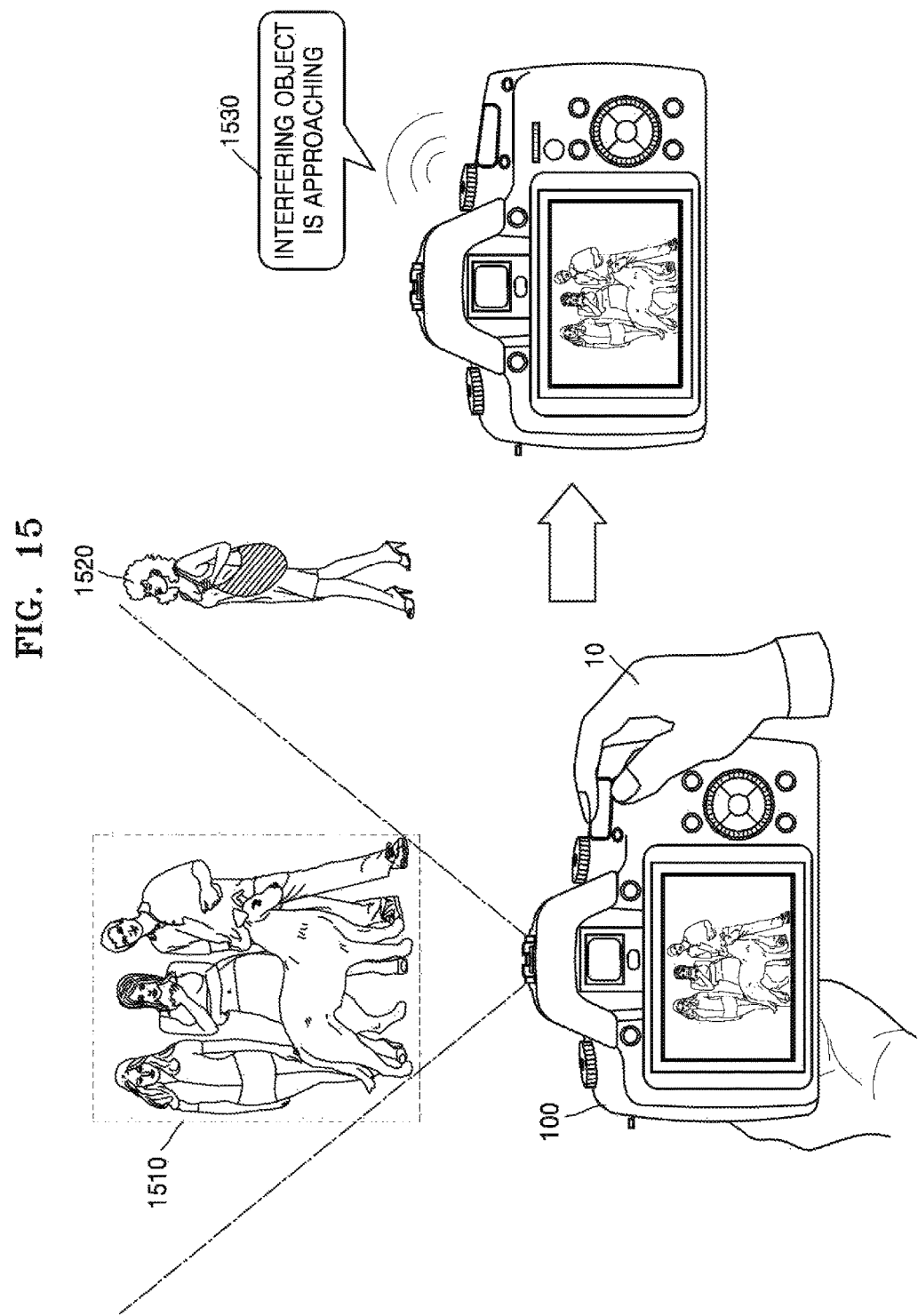
FIG. 15 is a diagram illustrating another example of generating a notification signal according to some embodiments.

FIG. 15 is a diagram illustrating another example of a notification signal.

Referring to FIG. 15, the processor may be configured to generate a notification signal corresponding to a sound output by the photographing device 100. For example, when a second subject 1520 approaches first subjects 1510 while the photographing device 100 is photographing the first subjects 1510, the processor may be configured to generate a notification signal and output the notification signal through a speaker included in the photographing device 100.

The notification signal may be, for example, a sound 1530 indicating that the second subject 1520 is moving to the view angle of a first lens. In FIG. 15, a voice indicating the approach of the second subject 1520 is illustrated as an example of the sound 1530, but the sound 1530 is not limited thereto. For example, any sound capable of notifying the user 10 that the second subject 1520 is moving toward the first subjects 1510 may correspond to the notification signal without any limitations.

According to the descriptions made above with reference to FIGS. 4 to 15, the photographing device 100 may detect a first subject and a second subject using images acquired through lenses provided therein and generate a warning signal. The photographing device 100 may also detect a first subject and a second subject using information received from an external device and images acquired through the lenses provided therein. For example, the external device may correspond to a separate lens installable in the photographing device 100. An example in which the photographing device 100 detects a first subject and a second subject using information received from an external device will be described in greater detail below with reference to FIG. 16.

Figure 16:
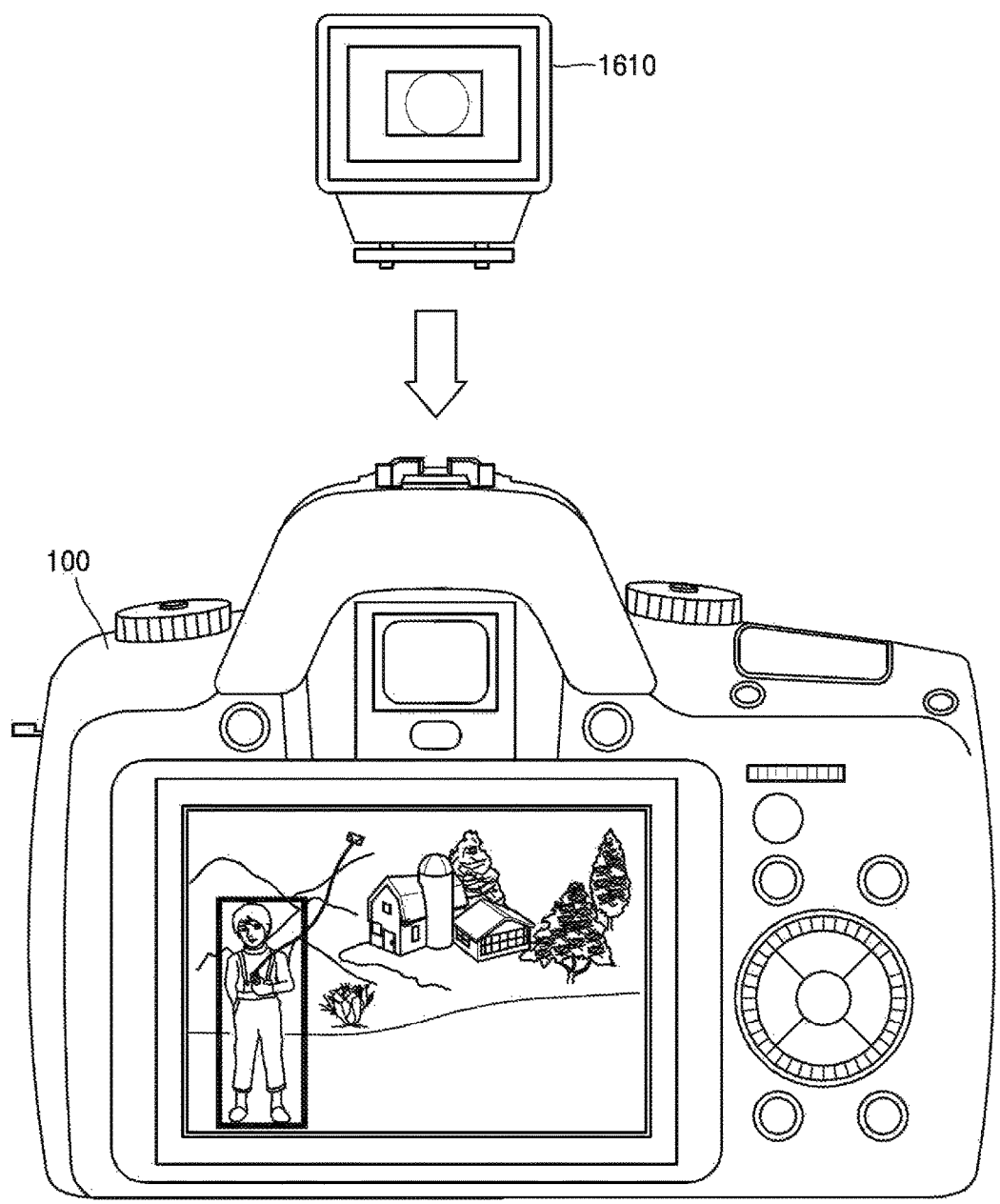
FIG. 16 is a diagram illustrating an example in which a photographing device detects a first subject and a second subject using information received from an external device.

FIG. 16 is a diagram illustrating an example in which a photographing device detects a first subject and a second subject using information received from an external device.

In FIG. 16, an example in which an external device 1610 is connected to the photographing device 100 is illustrated. For example, the external device 1610 may be a lens used to take a depth image (referred to as "depth lens" below).

A depth lens may refer, for example, to a lens used to take an image including not only the figure of a subject but also 3D information (i.e., information on the distance between the subject and the photographing device 100 or the distance between subjects). In an example, using images taken by two stereoscopic lenses provided at different positions, the photographing device 100 may generate an image including 3D information of a space. In another example, the photographing device 100 may emit light to a space through the depth lens, and generate an image including 3D information of the space using a pattern of reflected light which is reflected by an object positioned in the space and back to the depth lens. In still another example, the photographing device 100 may emit light to a space including a subject through the depth lens, and generate an image including 3D information of the space based on the amount of charge corresponding to reflected light which is reflected by an object positioned in the space and back to the depth lens.

The processor may be configured to detect a first subject and a second subject using information which represents a subject and is received from the external device 1610 and images acquired through lenses included in the photographing device 100.

For example, assuming that the external device 1610 is a depth lens, the processor may be configured to detect a first subject and a second subject using a depth image acquired through the depth lens and color images acquired through the lenses included in the photographing device 100. The processor may be configured to acquire motion information of the second subject using the aforementioned depth image and the aforementioned color images of the second subject, and determine whether or not the second subject approaches the view angle of a first lens (i.e., whether the second subject approaches the first subject).

The processor may be configured to control a photographing method based on whether or not the second subject approaches the view angle of a first image (i.e., an image including the first subject). As an example, when the photographing device 100 is set in a mode for taking a still image, the processor may be configured to determine whether or not to take a still image based on whether or not the second subject is included in the view angle of the first image. As another example, when the photographing device 100 is set in a mode for taking a video, the processor may be configured to change a sampling rate of video frames to be included in a video based on whether or not the second subject is included in the view angle of the first image.

Examples in which the processor is configured to control a photographing method will be described in greater detail below with reference to FIGS. 17A to 18.

FIGS. 17A and 17B are diagrams illustrating an example in which a way of taking a still image may be controlled.

In FIG. 17A, an example in which a second subject 1721 is not included in the view angle of a first image (i.e., an image including first subjects 1711) is illustrated. In FIG. 17B, an example in which a second subject 1722 is included in the view angle of a first image (i.e., an image including first subjects 1712) is illustrated.

When the photographing device 100 is set in the mode for taking a still image, the processor may be configured to determine whether or not to take a still image based on whether or not the second subjects 1721 and 1722 are included in the view angles of the first images.

As illustrated in FIG. 17A, when the second subject 1721 is moving toward the first subjects 1711 but is not yet included in the view angle of the first image, the processor may be configured to control the photographing device 100 so that the first image is taken. For example, in response to an action of the user 10, such as pressing the shutter button of the photographing device 100, the processor may be configured to control the photographing device 100 so that the first image showing the first subjects 1711 is taken.

Alternatively, as illustrated in FIG. 17B, when the second subject 1722 is included in the view angle of the first image, the processor may be configured to control the photographing device 100 so that the first image is not taken. For example, the processor may be configured to control the photographing device 100 so that the first image showing the first subjects 1712 is not taken even when the user presses the shutter button of the photographing device 100.

As described above with reference to FIGS. 14 and 15, a notification signal may be output through screens 1731 and 1732 in which live view images are output or a speaker of the photographing device 100 regardless of whether or not the first image is taken.

Figure 18:
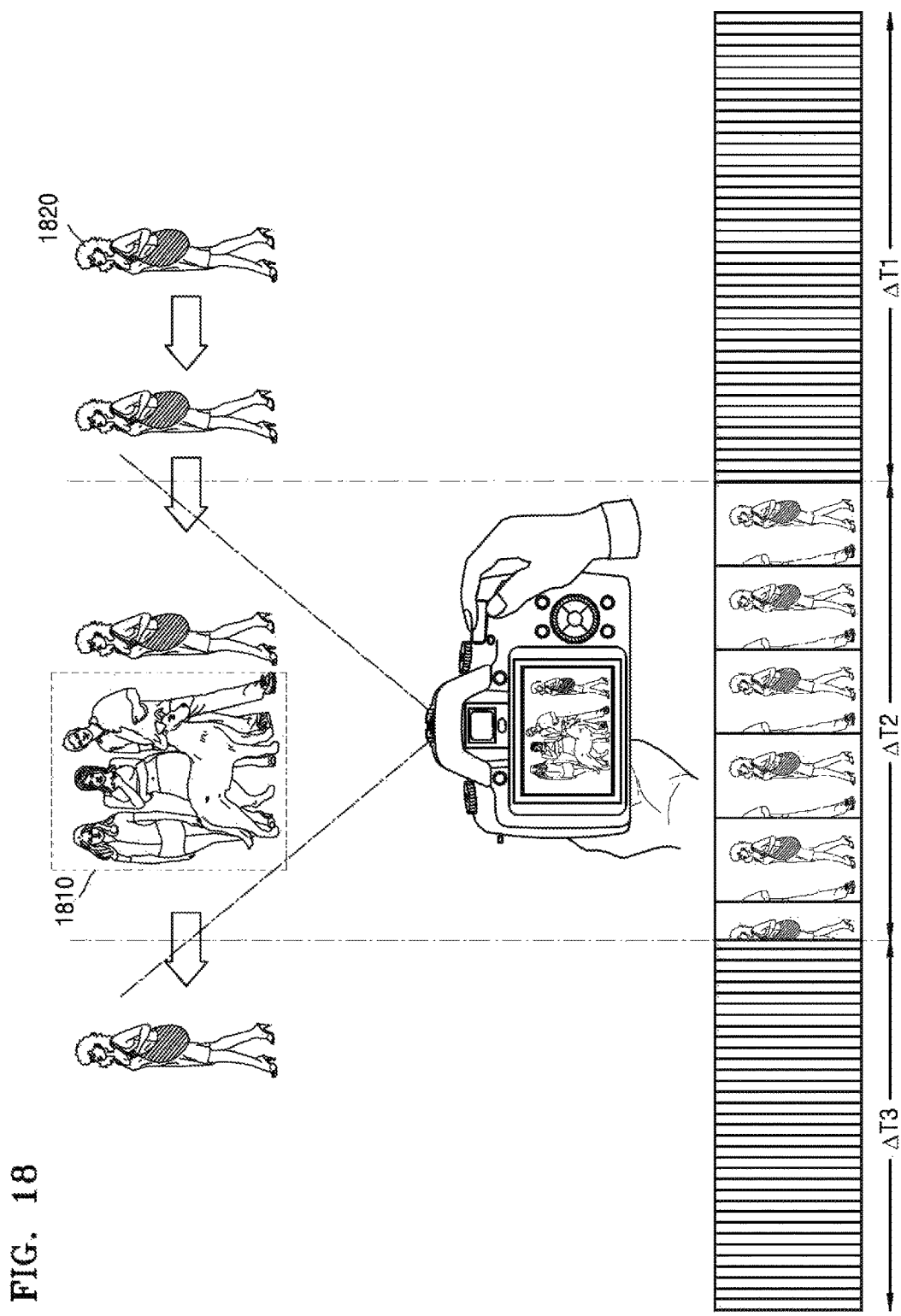
FIG. 18 is a diagram illustrating an example in which a way of taking a video is controlled.

FIG. 18 is a diagram illustrating an example in which a way of taking a video may be controlled.

In FIG. 18, an example in which a video frame sampling rate is changed based on whether or not a second subject 1820 is included in the view angle of a first image (i.e., an image including first subjects 1810) is illustrated. For example, FIG. 18 illustrates that the second subject 1820 is not included in the view angle of the first image during time periods ΔT1 and ΔT3 and is included in the view angle of the first image during a time period ΔT2.

When the photographing device 100 is set in the mode for taking a video, the processor may be configured to change the video frame sampling rate of the time period ΔT2. For example, the processor may sample video frames at a rate of M frames per second (fps) during the time period ΔT1, at a rate of N fps during the time period ΔT2, and at a rate of M fps again during the time period ΔT3. For example, M is a larger natural number than N.

In other words, the processor may sample video frames at a higher rate in the time periods ΔT1 and ΔT3 in which the second subject 1820 is not included in the view angle of the first image than in the time period ΔT2 in which the second subject 1820 is included in the view angle of the first image.

Figure 19:
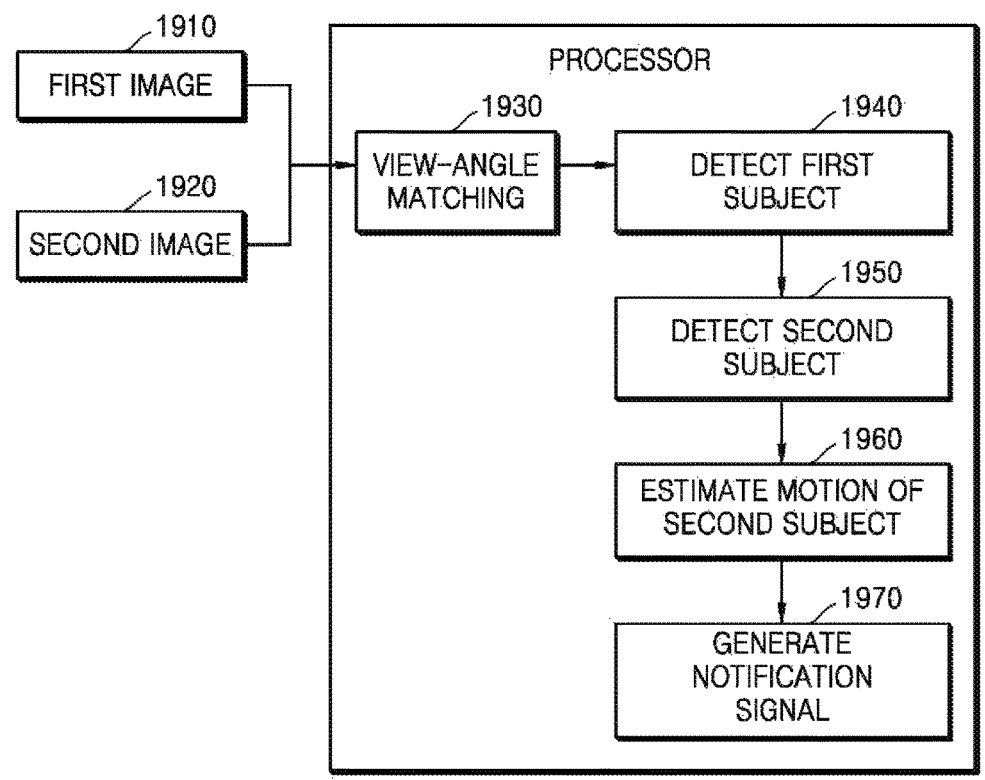
FIG. 19 is a flowchart illustrating an example in which a way of taking a still image is controlled.

FIG. 19 is a flowchart illustrating an example in which a way of taking a still image may be controlled.

Referring to FIG. 19, a method of controlling a way of taking a still image includes operations processed over time in the photographing device 100 or 100a or the electronic device 100b illustrated in FIGS. 1 to 5. Therefore, it may be seen that, even if omitted below, the descriptions made above regarding the photographing device 100 or 100a or the electronic device 100b shown in FIGS. 1 to 5 are applied to the method of a processor controlling a way of taking a still image illustrated in FIG. 19.

The processor is configured to acquire a first image 1910 and a second image 1920. For example, the first image 1910 and the second image 1920 may be acquired through a plurality of lenses included in the photographing device 100. For example, the first image 1910 may be acquired through a lens having a narrow view angle, and the second image 1920 may be acquired through a lens having a wide view angle. The first image 1910 may be an image including a first subject that the user 10 intends to photograph, and the second image 1920 may be an image including a second subject as well as the first subject. For example, the second subject denotes a subject that hinders the user 10 from photographing the first subject and is capable of moving by itself.

Although not illustrated in FIG. 19, the processor may also be configured to receive information from an external device (e.g., a depth lens).

The processor is configured to perform view-angle matching between the first image 1910 and the second image 1920 (1930). For example, the processor may be configured to perform the view-angle matching by determining which portion of the second image 1920 corresponds to the first image 1910. The view-angle matching may be pre-performed during manufacturing of the photographing device 100, or may be performed based on an instruction of the user 10.

The processor is configured to detect the first subject in the first image 1910 (1940). Examples in which the processor detects the first subject in the first image 1910 may, for example, be as described above with reference to FIGS. 8 to 10.

The processor is configured to detect the second subject in the second image 1920 (1950). An example in which the processor detects the second subject in the second image 1920 may, for example, be as described above with reference to FIG. 11.

The processor is configured to estimate a motion of the second subject (1960). For example, the processor is configured to acquire motion information of the second subject. The processor is configured to determine whether or not the second subject approaches the view angle of the first image 1910. For example, the motion information may include information representing which direction the second subject moves and/or how fast the second subject moves. Examples in which the processor acquires the motion information of the second subject and determines whether or not the second subject approaches the view angle of the first image 1910 may, for example, be as described above with reference to FIGS. 12 and 13.

The processor is configured to generate a notification signal (1970). For example, the processor is configured to generate a notification signal based on whether or not the second subject approaches the view angle of the first image 1910. For example, the notification signal may be a signal corresponding to an image or a sound output by the photographing device 100. Examples of a notification signal generated by the processor may, for example, be as described above with reference to FIGS. 14 and 15.

Although not illustrated in FIG. 19, the processor may be configured to determine whether or not to take a picture based on whether or not the second subject approaches the view angle of the first image 1910. For example, when the photographing device 100 is set in the mode for taking a still image, the processor may be configured to determine whether or not to take a still image based on whether or not the second subject is included in the view angle of the first image 1910. An example in which the processor is configured to determine whether or not to take a still image may, for example, be as described above with reference to FIGS. 17A and 17B.

Figure 20:
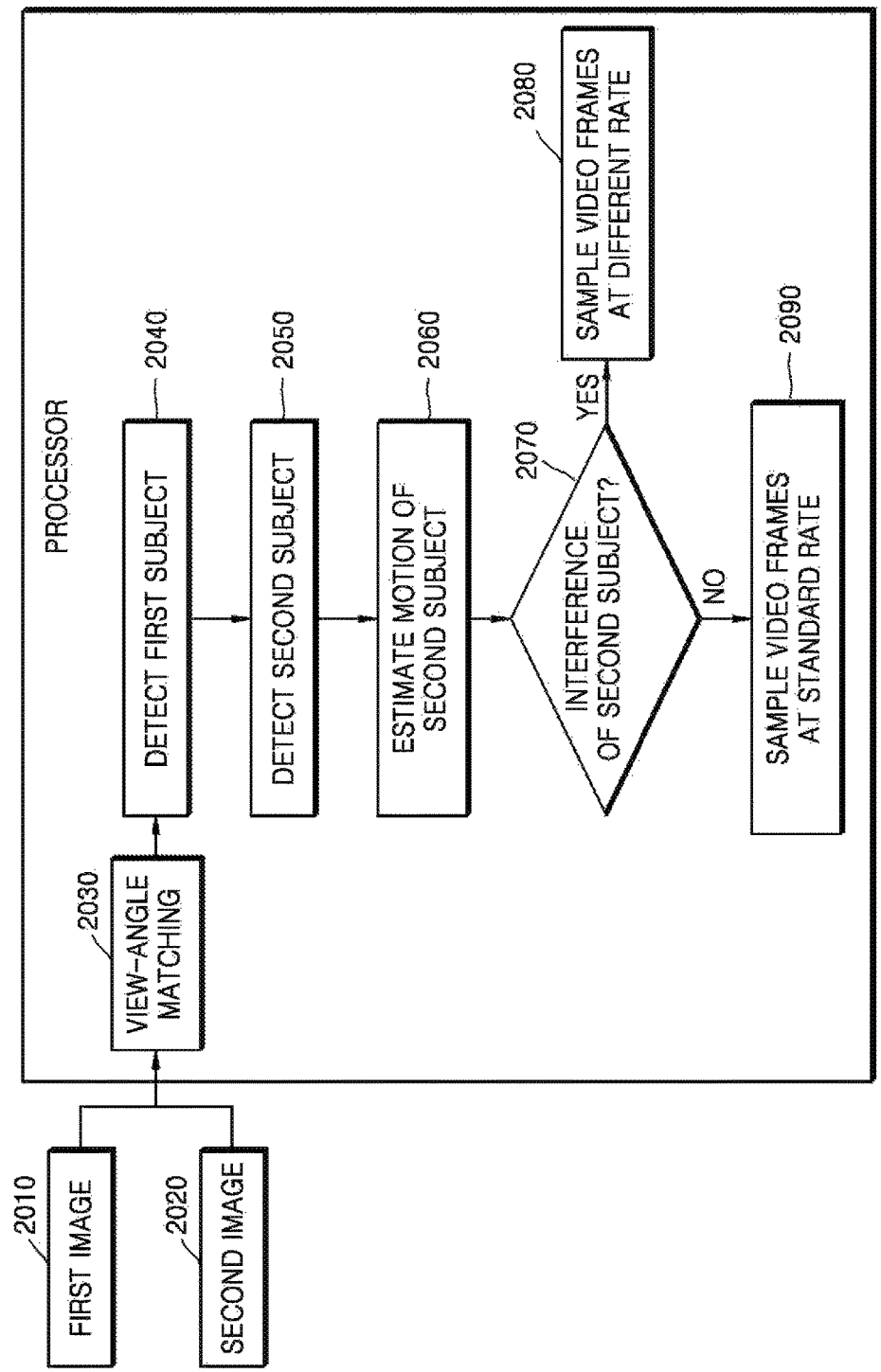
FIG. 20 is a flowchart illustrating an example in which a way of taking a video is controlled.

FIG. 20 is a flowchart illustrating an example in which a way of taking a video may be controlled.

Referring to FIG. 20, a method of controlling a way of taking a video includes operations processed over time in the photographing device 100 or 100a or the electronic device 100b illustrated in FIGS. 1 to 5. Therefore, it may be seen that, even if omitted below, the descriptions made above regarding the photographing device 100 or 100a or the electronic device 100*b* illustrated in FIGS. 1 to 5 may be applied to the method of controlling a way of taking a video illustrated in FIG. 20.

Operation 2030 to operation 2060 of FIG. 20 correspond to operation 1930 to operation 1960 of FIG. 19. Therefore, detailed descriptions of operation 2030 to operation 2060 are omitted below.

The processor is configured to determine whether or not there is interference of a second subject (2070). For example, the interference of the second subject may refer, for example, to a case in which the second subject is included only in the view angle of a second image 2020 and will be included in the view angle of a first image 2010 due to movement of the second subject. For example, the processor is configured to determine whether or not the second subject is included in the view angle of the first image 2010.

When there is interference of the second subject, the process proceeds to operation 2080. Otherwise, the process proceeds to operation 2090.

When there is interference of the second subject, the processor is configured to sample video frames at a different rate (2080). For example, the different rate refers to a sampling rate different from a standard sampling rate set in the photographing device 100. For example, when there is interference of the second subject, the processor may be configured to sample video frames at a lower rate than the standard sampling rate.

When there is no interference of the second subject, the processor is configured to sample video frames at a standard rate (2090). For example, the standard rate may be a rate which is preset during manufacturing of the photographing device 100, or may be set based on an instruction of the user 10.

Although not illustrated in FIG. 20, the processor may be configured to generate a notification signal. For example, the processor may be configured to generate a notification signal based on whether or not the second subject approaches the view angle of the first image 2010. Examples of a notification signal generated by the processor may, for example, be as described above with reference to FIGS. 14 and 15.

According to the descriptions made above with reference to FIGS. 1 to 20, when an approach of a second subject is detected during the photography of a first subject, the photographing device 100 may generate a notification signal. Therefore, the user 10 may accurately take an image of a subject without interference of other subjects.

Live view images of a subject may be output on the screen of the photographing device 100. Assuming that the position of the photographing device 100 is fixed and a subject is a moving object, the figure of the subject may leave the live view images due to a movement of the subject. For example, since the photographing device 100 is fixed at a certain position, only a certain region is included in the view angle of a lens included in the photographing device 100. Therefore, even if the subject is included in the view angle of the lens, when the subject moves and leaves the view angle of the lens, the figure of the subject may not be shown in the live view images.

When images acquired through all lenses included in the photographing device 100 are synthesized and output as a live view image, a subject to be checked by the user 10 is shown as a small portion of the live view image. For example, when the photographing device 100 synthesizes images of different regions and outputs an image, a subject which the user is interested in is shown as a small portion of the output image.

A method of the photographing device 100 tracking the moving path of a subject and continuously including the subject in live view images will be described in greater detail below with reference to FIGS. 21 to 25.

Figure 21:
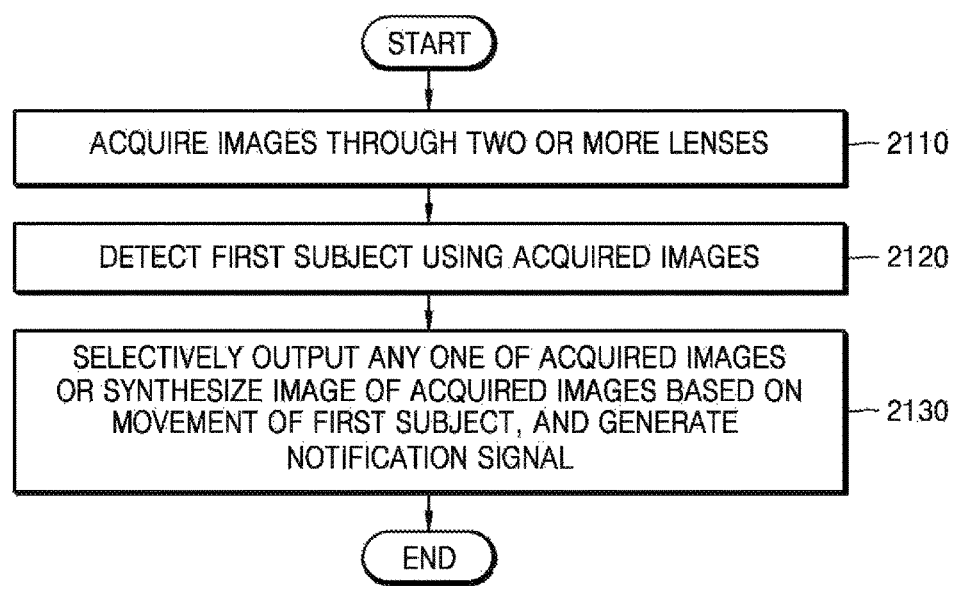
FIG. 21 is a flowchart illustrating another example of a method of controlling a photographing device.

FIG. 21 is a flowchart illustrating another example of a method of controlling a photographing device.

Referring to FIG. 21, a method of controlling a photographing device includes operations processed over time in the photographing device 100 or 100*a* or the electronic device 100*b* illustrated in FIGS. 1 to 5. Therefore, it may be seen that, even if omitted below, the descriptions made above regarding the photographing device 100 or 100*a* or the electronic device 100*b* illustrated in FIGS. 1 to 5 may be applied to the method of controlling a photographing device illustrated in FIG. 21.

In operation 2110, the processor is configured to acquire images through two or more lenses. For example, the two or more lenses may have different view angles or the same view angle. Assuming that two lenses are included in the photographing device, when the lenses have different view angles, a first lens may have a narrower view angle than a second lens.

An example in which lenses having different view angles are included in the photographing device 100 may, for example, be as described above with reference to FIG. 4, and an example in which lenses having the same view angle are included in the photographing device 100 may, for example, be as described above with reference to FIG. 5.

In operation 2120, the processor is configured to detect a first subject using the acquired images. For example, the first subject denotes a subject that is included in a final image generated by the photographing device and that a user intends to photograph.

In an example, the processor may be configured to detect the first subject among subjects included in a first image based on a user input. For example, the first image may denote a target that the user 10 intends to photograph, and may be acquired through a lens having a narrow view angle.

In another example, the processor may be configured to detect the figures of respective subjects included in the first image and select the first subject using the detected figures. For example, the processor may be configured to detect the figures of the subjects in the first image using an object segmentation technique, and to select the first subject from among the detected figures.

In still another example, the processor may be configured to detect the first subject among the subjects included in the first image using pre-stored subject information. For example, the processor may be configured to read out information on previously photographed subjects from a memory, and to select a subject corresponding to the information read out from the memory among the subjects included in the first image as the first subject.

Examples in which the processor is configured to detect the first subject using acquired images may, for example, be as described above with reference to FIGS. 8 to 10.

In operation 2130, based on movement of the first subject, the processor is configured to selectively output any one of the acquired images or an image obtained by synthesizing acquired images. For example, it is assumed that two lenses are included in the photographing device 100, and first and second images are acquired through first and second lenses, respectively. Also, it is assumed that the subject moves from a region of the view angle of the first lens to a region of the view angle of the second lens. In this example, the processor is configured to output the first image, a synthesized image of the first image and the second image, and the second image in sequence on the screen of the photographing device 100.

An example in which the processor is configured to control the photographing device 100 so that a first subject is continuously included in live view images will be described in greater detail below with reference to FIGS. 22 to 24.

Figures 22A, 22B:
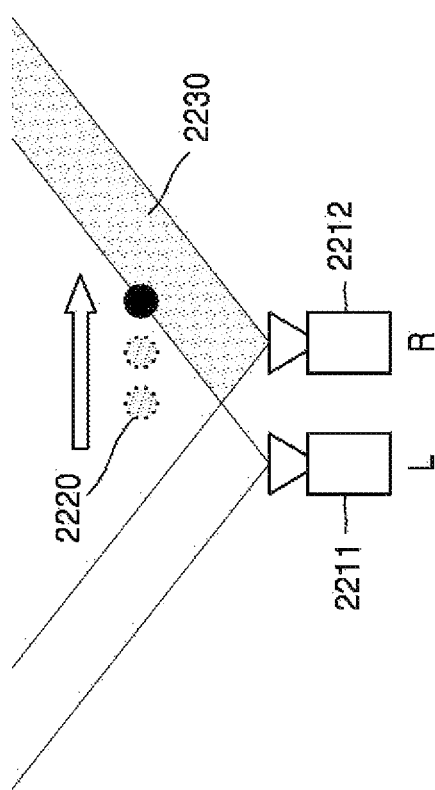
FIGS. 22A and 22B are diagrams illustrating an example in which a live view image is output based on movement of a first subject.

FIGS. 22A and 22B are diagrams illustrating an example in which a live view image is output based on movement of a first subject.

In FIG. 22A, a plurality of lenses 2211 and 2212 included in the photographing device 100 are illustrated. For convenience of description, the two lenses 2211 and 2212 are shown to have the same view angle in FIG. 22A.

Although the lenses 2211 and 2212 have the same view angle, the respective positions of the lenses 2211 and 2212 in the photographing device 100 differ from each other, and thus a region covered by the view angle of the first lens 2211 may differ from a region covered by the view angle of the second lens 2212. For example, there may be a region 2230 corresponding to a difference between the view angle of the first lens 2211 and the view angle of the second lens 2212. When the position of the photographing device 100 is adjusted so that a first subject 2220 is included in the view angle of the first lens 2211, the first subject 2220 may leave the view angle of the first lens 2211 and enter the view angle of the second lens 2212 based on movement of the first subject 2220.

In FIG. 22B, an example of a live view image 2240 acquired through the first lens 2211 is illustrated. Even when the position of the photographing device 100 is adjusted so that the first subject 2220 is positioned at the center of the live view image 2240, the figure of the first subject 2220 may disappear in the live view image 2240 based on movement of the first subject 2220.

Figure 23:
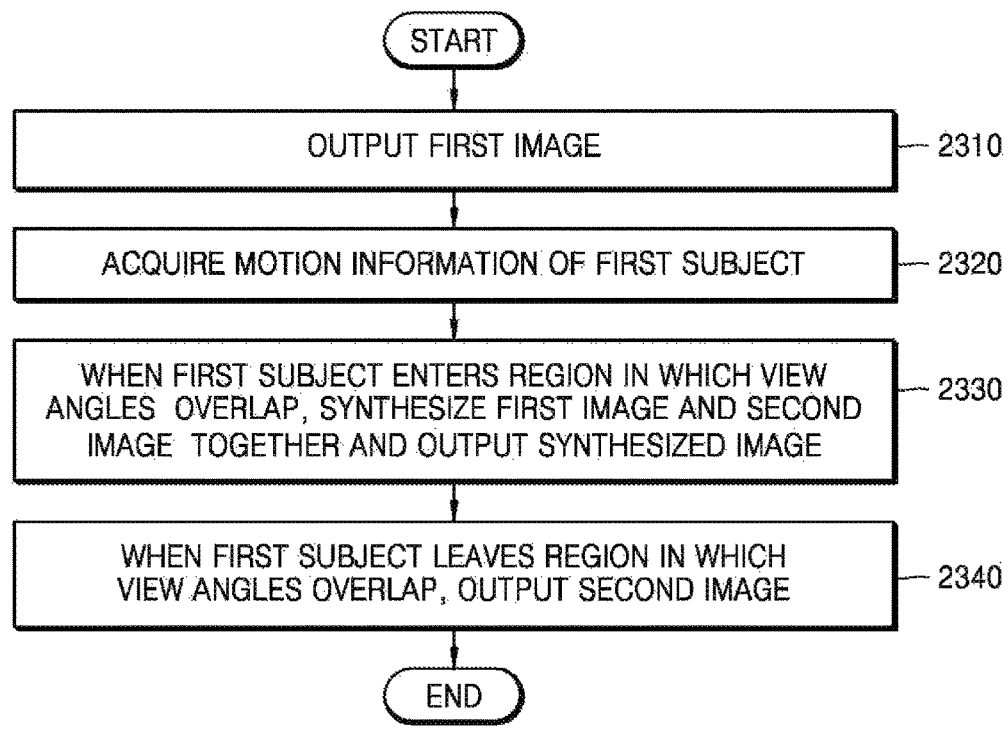
FIG. 23 is a flowchart illustrating an example in which live view images are output based on movement of a first subject.

FIG. 23 is a flowchart illustrating an example in which live view images may be output according to movement of a first subject.

Operation 2310 to operation 2340 correspond to the detailed process of operation 2130 of FIG. 21.

In operation 2310, the processor is configured to output a first image. For example, the first image denotes a live view image including a first subject.

In operation 2320, the processor is configured to acquire motion information of the first subject. For example, the motion information includes information representing which direction the first subject moves and/or how fast the first subject moves. Examples in which the processor acquires motion information of a first subject may, for example, be as described above with reference to FIGS. 12 and 13.

In operation 2330, when the first subject enters a region in which view angles overlap each other, the processor is configured to synthesize the first image and a second image together, and to output a synthesized image. For example, the first image denotes an image acquired through a first lens included in the photographing device 100, and the second image denotes an image acquired through a second lens included in the photographing device 100. The region in which view angles overlap each other denotes a region in which the view angle of the first lens and the view angle of the second lens overlap each other. For example, the region in which view angles overlap each other may denote the region 2230 of FIG. 22.

The processor is configured to calibrate the first image and the second image to detect the region in which the view angle of the first lens and the view angle of the second lens overlap each other. For example, the processor may be configured to calibrate the first image and the second image based on the positions of subjects shown commonly in the first image and the second image. The processor is configured to synthesize regions of the first image and the second image in which the view angles overlap each other. For example, the processor may be configured to perform α-blending to synthesize the first image and the second image together. The processor is configured to output a synthesized image of the first image and the second image on the screen.

In operation 2340, when the first subject leaves the region in which the view angles overlap each other, the processor is configured to output the second image.

An example in which the processor is configured to output images according to the method described above with reference to FIG. 23 will be described in greater detail below with reference to FIG. 24.

Figure 24:
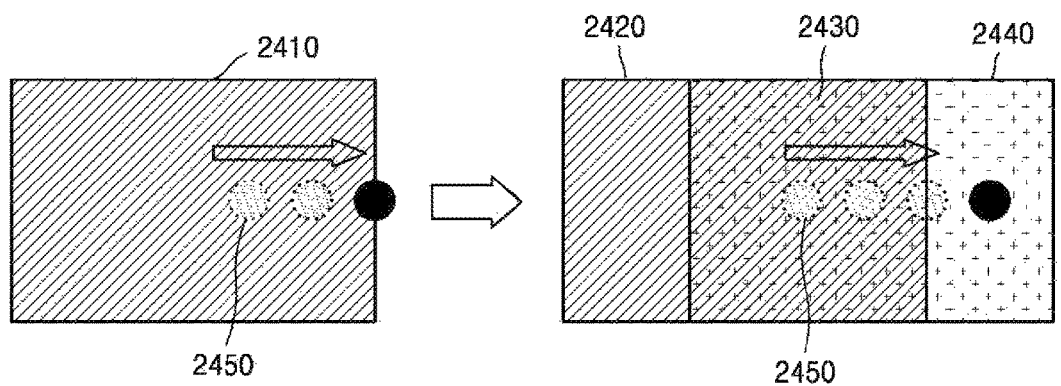
FIG. 24 is a diagram illustrating an example in which an image is output.

FIG. 24 is a diagram illustrating an example in which an image may be output.

The processor is configured to output a first image 2410 including a first subject 2450 on the screen of the photographing device 100. The processor is configured to acquire motion information of the first subject 2450, and checks whether or not the first subject 2450 enters a region 2430 in which the first image 2420 and a second image 2440 overlap (i.e., a region in which the view angle of the first lens and the view angle of the second lens overlap).

When the first subject 2450 enters the region 2430, the processor is configured to synthesize the region 2430 included in the first image 2420 and the region 2430 included in the second image 2440 together. For example, the processor may be configured to perform α-blending to synthesize the first image 2420 and the second image 2440 together. The processor is configured to output a synthesized image on the screen of the photographing device 100. The processor is configured to check whether or not the first subject 2450 enters a region only included in the second image 2440.

When the first subject 2450 enters the region only included in the second image 2440, the processor is configured to output the second image 2440 on the screen of the photographing device 100.

Figure 25:
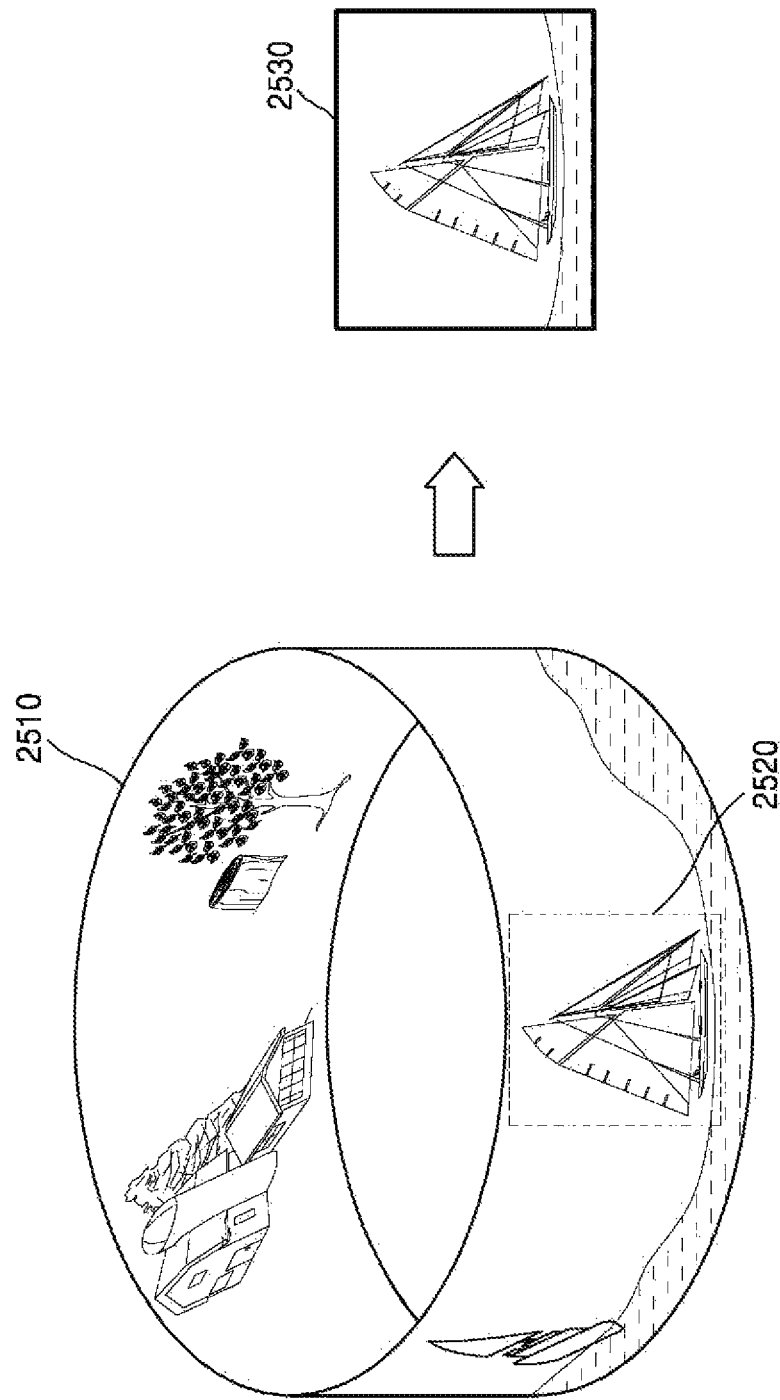
FIG. 25 is a diagram illustrating another example in which an image is output.

FIG. 25 is a diagram illustrating another example an image may be output.

In FIG. 25, an example of an image 2510 acquired through a 360° camera included in the photographing device 100 is illustrated. For example, the 360° camera denotes a camera having a view angle of 360°. Therefore, in a live view image acquired through the 360° camera, a first subject 2520 that the user 10 wants to observe is displayed in a small region.

The processor is configured to detect the first subject 2520 in the image 2510 acquired through the 360° camera. Examples in which the processor detects the first subject 2520 in the image 2510 may, for example, be as described above with reference to FIGS. 8 to 10.

The processor is configured to generate an image 2530 only showing the first subject 2520, and to output the generated image 2530 on the screen of the photographing device 100. Since the photographing device 100 is able to generate an omnidirectional image through the 360° camera, the image 2530 may be generated and output on the screen of the photographing device 100 even when the first subject 2520 moves.

According to the above descriptions, the photographing device 100 may generate a notification signal when an approach of a second subject is detected during the photography of a first subject. Therefore, the user 10 may accurately take an image of the first subject without interference of other subjects.

Also, the photographing device 100 may track the moving path of the first subject and generate live view images to continuously show the first subject. Therefore, the user 10 may continuously observe the figure of the first subject that he or she wants to photograph.

Meanwhile, the method described above may be written as a computer-executable program, and implemented in a general-purpose digital computer which runs the program using a computer-readable recording medium. Also, a data structure used in the above-described method may be recorded in the computer-readable recording medium using various tools. Examples of the computer-readable recording medium include storage media, such as magnetic storage media (e.g., a ROM, a RAM, a USB memory, a floppy disk, a hard disk, etc.) and optical storage media (e.g., a CD-ROM, a DVD, etc.).

The above-described method may be performed by executing instructions included in at least one program maintained in the computer-readable recording media. When the instructions are executed by a computer, the computer may perform functions corresponding to the instructions. For example, the instructions may include a high-level language code executable by a computer using an interpreter, etc. as well as a machine language code created by a compiler. In the present disclosure, an example of a computer may be a processor, and an example of a recording medium may be a memory.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:
1. A photographing device comprising:
two or more lenses, each of the two or more lenses having different view angles; and
a processor configured to at least:
control detecting of one or more subjects based on images acquired using the lenses;
control determining, based on images acquired using the lenses, whether a second subject approaches a view angle for a first lens within which a first subject, but not the second subject, is detected; and
control generating of a notification signal based on determining that the second subject approaches the view angle for the first lens.

2. The photographing device of claim 1, wherein the first subject comprises a subject included in a final image generated by the photographing device.

3. The photographing device of claim 1, wherein the processor is configured to control selecting, as the second subject, one or more subjects other than the first subject which are detected within a view angle for a second lens different than the first lens.

4. The photographing device of claim 1, wherein the processor is configured to control detecting the first subject among multiple subjects included in an image acquired using the lenses, based on a received input.

5. The photographing device of claim 1, wherein the processor is configured to control detecting figures of respective subjects included in an image acquired using the lenses, and to control selecting the first subject based on the detected figures.

6. The photographing device of claim 1, wherein the processor is configured to control detecting the first subject among subjects included in an image acquired using the lenses based on pre-stored subject information.

7. The photographing device of claim 1, wherein the processor is configured to control acquiring motion information of the second subject based on images acquired using the lenses, and the determining of whether the second subject approaches the view angle for the first lens is based on the motion information.

8. The photographing device of claim 1, wherein the processor is configured to control acquiring motion information of the second subject using pre-stored subject information, and the determining of whether the second subject approaches the view angle for the first lens is based on the motion information.

9. The photographing device of claim 1, wherein the notification signal includes one or both of a signal corresponding to an image and a sound output by the photographing device.

10. The photographing device of claim 1, wherein the processor is configured to control detecting the first subject based on images acquired using the lenses and information representing subjects received from an external device.

11. The photographing device of claim 1, wherein the processor is configured to control determining whether to take an image based on whether the second subject is detected within the view angle of the first lens.

12. The photographing device of claim 1, wherein the processor is configured to control changing a video frame sampling rate based on whether the second subject is detected within the view angle of the first lens.

13. The photographing device of claim 1, further comprising a memory configured to store information relating to the first subject.

14. A method of controlling a photographing device, the method comprising:
acquiring images through two or more lenses, each of the two or more lens having different view angles;
detecting one or more subjects based on images acquired using the lenses;
determining, based on images acquired using the lenses, whether a second subject approaches a view angle for a first lens within which a first subject, but not the second subject, is detected; and
generating a notification signal based on determining that the second subject approaches the view angle for the first lens.

15. The method of claim 14, wherein the first subject comprises a subject included in a final image generated by the photographing device.

16. The method of claim 14, further comprising selecting one or more subjects other than the first subject which are detected within in a view angle for a second lens different than the first lens as the second subject.

17. The method of claim 14, wherein the detecting of the first subject comprises detecting the first subject among multiple subjects included in an image acquired using the lenses, based on a received input.

18. The method of claim 14, wherein the detecting of the first subject comprises detecting figures of respective subjects included in an image acquired using the lenses, and selecting the first subject based on the detected figures.

19. The method of claim 14, wherein the detecting of the first subject comprises detecting the first subject among multiple subjects included in an image acquired using the lenses, based on pre-stored subject information.

20. A non-transitory computer-readable recording medium storing a program which, when executed, causes a computer to control a photographing device to at least:
- acquire images through two or more lenses, each of the two or more lens having different view angles;
- detecting one or more subjects based on images acquired using the lenses;
- determining, based on images acquired using the lenses, whether a second subject approaches a view angle for a first lens within which a first subject, but not the second subject, is detected; and
- generating a notification signal based determining that the second subject approaches the view angle for the first lens.

* * * * *